United States Patent
Jo

(10) Patent No.: US 10,908,839 B2
(45) Date of Patent: Feb. 2, 2021

(54) STORAGE DEVICE THROTTLING AMOUNT OF COMMUNICATED DATA DEPENDING ON SUSPENSION FREQUENCY OF OPERATION

(71) Applicant: SAMSUNG ELECTRONICS CO., LTD., Suwon-si (KR)

(72) Inventor: Myung Hyun Jo, Hwasung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/428,334

(22) Filed: May 31, 2019

(65) Prior Publication Data

US 2020/0159444 A1 May 21, 2020

(30) Foreign Application Priority Data

Nov. 16, 2018 (KR) .................. 10-2018-0141528

(51) Int. Cl.
G06F 13/00 (2006.01)
G06F 3/06 (2006.01)

(52) U.S. Cl.
CPC .......... G06F 3/0655 (2013.01); G06F 3/0604 (2013.01); G06F 3/0671 (2013.01)

(58) Field of Classification Search
CPC ..... G06F 3/0655; G06F 3/0604; G06F 3/0671
See application file for complete search history.

(56) References Cited

U.S. PATENT DOCUMENTS

| | | | | |
|---|---|---|---|---|
| 5,822,244 A | * | 10/1998 | Hansen | G06F 13/4239 |
| | | | | 365/185.11 |
| 6,930,925 B2 | * | 8/2005 | Guo | G11C 16/12 |
| | | | | 365/185.28 |
| 7,064,994 B1 | | 6/2006 | Wu | |
| 8,209,439 B2 | * | 6/2012 | Marcu | G06F 3/0611 |
| | | | | 710/6 |
| 8,370,562 B2 | | 2/2013 | Lasser | |
| 8,850,103 B2 | * | 9/2014 | Bennett | G11C 16/10 |
| | | | | 711/103 |
| 9,021,158 B2 | * | 4/2015 | Hyun | G11C 16/10 |
| | | | | 710/15 |
| 9,274,966 B1 | | 3/2016 | Chahwan et al. | |
| 9,582,211 B2 | | 2/2017 | Ellis et al. | |

(Continued)

FOREIGN PATENT DOCUMENTS

KR 10-2019-0019364 A 2/2019
KR 10-2019-0032716 A 3/2019

*Primary Examiner* — Jing-Yih Shyu
(74) *Attorney, Agent, or Firm* — Sughrue Mion, PLLC

(57) ABSTRACT

A storage device includes a memory and a controller. The controller controls the memory such that, in response to a request for a first read operation on the memory while a first write operation is performed on the memory, the first write operation is suspended, and the first read operation is performed, the suspended first write operation is resumed after the first read operation is completed, and second write operation subsequent to the first write operation is performed on the memory after the resumed first write operation is completed. The controller throttles an amount of data communicated to the memory device for the second write operation or for a second read operation subsequent to the first read operation, based on a frequency that the first write operation is suspended.

17 Claims, 17 Drawing Sheets

(56) References Cited

U.S. PATENT DOCUMENTS

| | | |
|---|---|---|
| 9,679,658 B2 | 6/2017 | Palster et al. |
| 9,886,214 B2 * | 2/2018 | Micheloni ............. G06F 3/0652 |
| 2014/0173213 A1 * | 6/2014 | Beveridge ........... G06F 12/0868 |
| | | 711/130 |
| 2016/0313946 A1 | 10/2016 | Zang et al. |
| 2017/0075626 A1 * | 3/2017 | Kim ...................... G06F 3/0659 |
| 2019/0057742 A1 | 2/2019 | Jeon et al. |
| 2019/0087332 A1 | 3/2019 | Jun et al. |
| 2019/0171360 A1 * | 6/2019 | Lee ........................ G11C 16/08 |
| 2019/0243577 A1 * | 8/2019 | Pelster .................. G06F 3/0604 |
| 2019/0354498 A1 * | 11/2019 | Ebsen .................. G06F 13/1626 |
| 2020/0135283 A1 * | 4/2020 | Park ...................... G06F 3/0604 |

\* cited by examiner

FIG. 11

| Suspension Count Range | The number of unit data |
|---|---|
| 0 ~ 20 | 15 |
| 21 ~ 40 | 5 |
| 41 ~ 60 | 3 |
| 61 ~ 80 | 2 |
| 81 ~ 99 | 1 |

… # STORAGE DEVICE THROTTLING AMOUNT OF COMMUNICATED DATA DEPENDING ON SUSPENSION FREQUENCY OF OPERATION

CROSS-REFERENCE TO THE RELATED APPLICATION

This application claims priority from Korean Patent Application No. 10-2018-0141528 filed on Nov. 16, 2018, in the Korean Intellectual Property Office, the disclosure of which is incorporated herein in its entirety by reference.

TECHNICAL FIELD

Example embodiments of the inventive concept relate to a storage device which is capable of storing and outputting data.

DESCRIPTION OF THE RELATED ART

A storage device of an electronic system is configured to store data requested by another electronic system. The storage device outputs the stored data to provide a storage service to a user or another electronic apparatus. The storage device manages the stored data to perform various internal management operations such as improving data reliability, a security level, operation efficiency, and the like.

Processing and outputting a large amount of data rapidly at the storage device is advantageous to improve quality of service and user satisfaction. Accordingly, techniques for processing data requested by a user or another electronic system with high performance are required.

SUMMARY

Example embodiments of the inventive concept provide a storage device and method that rapidly respond to a request for a memory operation (e.g., a read operation for outputting data stored in a storage device) of a high priority. The example embodiments enable the storage device to throttle or adjust an amount of communicated data depending on a suspension frequency of the operation.

According to example embodiments, the storage device may include a memory and a controller.

According to example embodiments, the controller may control the memory device such that, in response to a request for a first read operation on the memory while a first write operation is performed on the memory, the first write operation is suspended, and the first read operation is performed, the suspended first write operation is resumed after the first read operation is completed, and second write operation subsequent to the first write operation is performed on the memory after the resumed first write operation is completed. The controller may throttle an amount of data communicated to the memory device for the second write operation or for a second read operation subsequent to the first read operation, based on a frequency that the first write operation is suspended.

According to example embodiments, the controller may communicate first data with the memory during a first time period, and communicate second data with the memory during a second time period after the first time period. The controller may adjust, based on a frequency that communication of the first data with the memory is suspended, an amount of the second data communicated with the memory per unit time.

According to example embodiments, the controller may control the memory such that, while first operations are performed on the memory, in response to receiving requests for second operations on the memory, the first operations are suspended and the second operations are completed earlier than the first operations. The controller may adjust, based on a frequency that each of preceding first operations among the first operations is suspended, a manner of communicating data with the memory to perform following first operations, among the first operations, subsequent to respective ones of the preceding first operations. As the controller adjusts the manner of communicating the data with the memory device, suspensions of the first operations may be distributed over a time period of the whole first operations.

According to example embodiments, the controller may control the memory such that, while a first operation is performed on the memory, when a second operation on the memory is requested, the first operation is suspended and the second operation is completed earlier than the first operation. The controller may monitor a frequency that the first operation is suspended. The controller may control the memory such that, based on the monitored frequency, data for a third operation subsequent to the first operation is communicated with the memory as much as a data amount or a bandwidth determined based on the monitored frequency. The controller may control the memory device such that, in a time interval before a fourth operation subsequent to the third operation starts after communication of the data with the memory device is completed, a fifth operation on the memory is performed without suspending an operation corresponding to the third operation and the fourth operation.

According to example embodiments, the storage device may provide a fast response with regard to an operation having a higher priority. Accordingly, quality of service of the storage device may be improved.

BRIEF DESCRIPTION OF THE DRAWINGS

The above and other aspects of the inventive concept will become apparent by describing in detail example embodiments thereof with reference to the accompanying drawings.

FIG. 11 is a table for describing an example operation of a controller of FIG. 3 according to some example embodiments.

DETAILED DESCRIPTION

The embodiments described herebelow are all exemplary, and thus, the inventive concept is not limited to these embodiments disclosed below and may be realized in various other forms. Below, some embodiments are described in detail and with reference to the accompanying drawings such that those skilled in the art can easily implement the inventive concept.

Figure 1:
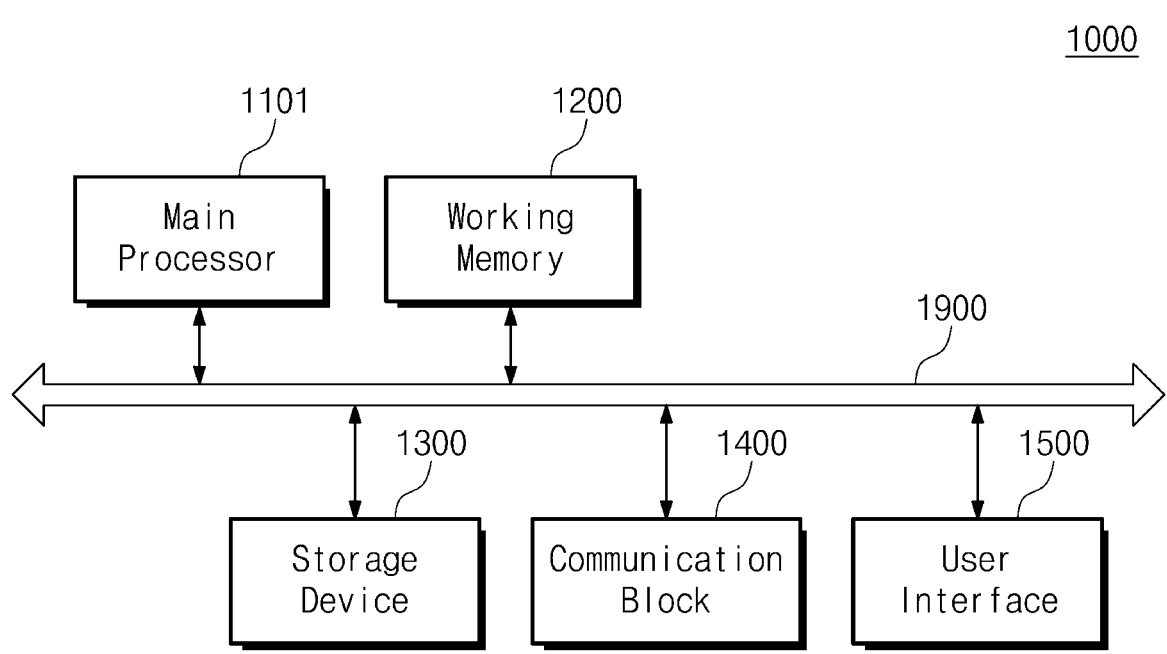
FIG. 1 is a block diagram illustrating an example configuration of an electronic system which includes a storage device according to some example embodiments.

FIG. 1 is a block diagram illustrating an example configuration of an electronic system which includes a storage device according to some embodiments.

Referring to FIG. 1, an electronic system 1000 may include a main processor 1101, a working memory 1200, a storage device 1300, a communication block 1400, a user interface 1500, and a bus 1900. For example, the electronic system 1000 may be one of electronic devices such as a desktop computer, a laptop computer, a tablet computer, a smart phone, a wearable device, a video game console, a workstation, a server, an electric vehicle, a home appliance, a medical device, and the like.

The main processor 1101 may control overall operations of the electronic system 1000. The main processor 1101 may include one or more processor cores configured to process various arithmetic/logical operations. The main processor 1101 may be implemented in a general-purpose processor, a special-purpose processor, or an application processor.

The working memory 1200 may store data used for an operation of the electronic system 1000. For example, the working memory 1200 may include a volatile memory (such as a static random access memory (SRAM), a dynamic RAM (DRAM), a synchronous DRAM (SDRAM), and/or the like) and/or a nonvolatile memory (such as a phase-change RAM (PRAM), a magneto-resistive RAM (MRAM), a resistive RAM (ReRAM), a ferroelectric RAM (FRAM), and/or the like).

The storage device 1300 may store data regardless of whether power is supplied. For example, the storage device 1300 may include a nonvolatile memory such as a flash memory, a PRAM, an MRAM, a ReRAM, an FRAM, and/or the like. For example, the storage device 1300 may be a storage medium such as a solid state drive (SSD), a card storage, an embedded storage, and/or the like.

The communication block 1400 may communicate with an external device/system of the electronic system 1000 in compliance with at least one of various wired/wireless communication protocols. The user interface 1500 may include various input/output interfaces to arbitrate in communication between a user and the electronic system 1000.

The bus 1900 may provide a communication path between components of the electronic system 1000. The components of the electronic system 1000 may exchange data with one another in compliance with a bus format of the bus 1900. For example, the bus format may include one or more of various interface protocols such as universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), nonvolatile memory express (NVMe), universal flash storage (UFS), Firewire, and/or the like.

The storage device 1300 may throttle or adjust an amount of data exchanged with another component, depending on a suspension frequency of an operation, to provide a fast response with regard to an operation of a high priority (e.g., a read operation for outputting data stored in the storage device 1300). Example configurations and operations of the storage device 1300 will be described with reference to FIGS. 2 to 17.

The storage device 1300 may be employed in any type of system or device which includes a memory element. For example, the storage device 1300 may be employed for a volatile memory and/or a nonvolatile memory which is implemented as the working memory 1200.

Figure 2:
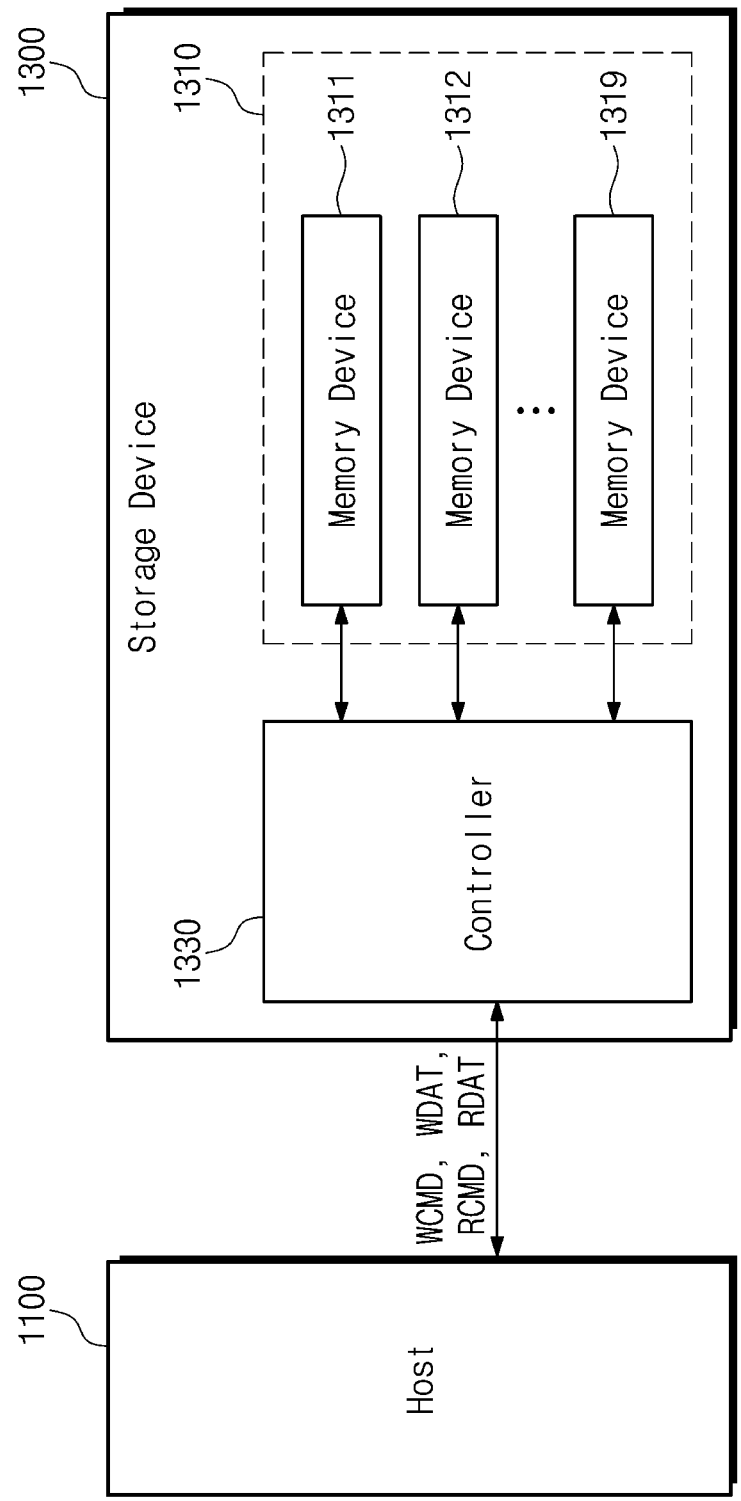
FIG. 2 is a block diagram illustrating an example configuration associated with a storage device of FIG. 1.

FIG. 2 is a block diagram illustrating an example configuration associated with the storage device 1300 of FIG. 1.

As described with reference to FIG. 1, the main processor 1101 may communicate with the storage device 1300 through the bus 1900. In the present disclosure, an object which is capable of accessing the storage device 1300 may be referred to as a "host" (e.g., a host 1100). The main processor 1101 may be an example of objects which are capable of operating as the host 1100, but the embodiment is not limited thereto.

The host 1100 may exchange data with the storage device 1300. The storage device 1300 may provide a storage service to the host 1100 in response to a command received from the host 1100.

For example, the host 1100 may provide the storage device 1300 with a command WCMD including a write request and data including write data WDAT. The storage device 1300 may perform a write operation in response to the write request, and thus, may store the requested write data WDAT. For example, the host 1100 may provide the storage device 1300 with a command RCMD including a read request. The storage device 1300 may perform a read operation in response to the read request, and thus, may output requested read data RDAT to the host 1100.

The storage device 1300 may include one or more memory devices 1310 and a controller 1330. FIG. 2 illustrates three memory devices 1311, 1312, and 1319, but the number of memory devices included in the storage device 1300 may be variously changed or modified.

Each of the memory devices 1311, 1312, and 1319 may store or output data requested by the host 1100. To this end, each of the memory devices 1311, 1312, and 1319 may include memory area(s) for storing data. For example, each of the memory devices 1311, 1312, and 1319 may include a NAND-type flash memory and may be implemented in compliance with a V-NAND scheme or a Z-NAND scheme. However, as described with reference to FIG. 1, a type and a configuration of each of the memory devices 1311, 1312, and 1319 may be variously changed or modified.

The memory area may be identified based on a value referred to as an "address". The write data WDAT may be stored in a memory area directed by an address, and the read data RDAT may be output from a memory area directed by an address. The host 1100 may provide address information to the storage device 1300 to communicate data with regard to a specific memory area of the memory devices 1311, 1312, and 1319.

The controller 1330 may control overall operations of the storage device 1300. For example, the controller 1330 may control the memory devices 1311, 1312, and 1319 such that the write data WDAT requested by the host 1100 is stored in the memory devices 1311, 1312, and 1319, or the read data RDAT requested by the host 1100 is output from the memory devices 1311, 1312, and 1319. For example, the controller 1330 may control the memory devices 1311, 1312, and 1319 such that data stored in the memory devices 1311, 1312, and 1319 migrates or is deleted in response to a request of the host 1100.

For example, the controller 1330 may perform various internal management operations (e.g., garbage collection, read reclaim, encryption, and/or the like) to manage data stored in the memory devices 1311, 1312, and 1319 (e.g., to improve data reliability, a security level, operation efficiency, and/or the like).

As various operations (e.g., a read operation, a write operation, a migration operation, a delete operation, an internal management operation, and/or the like) are performed, the controller 1330 may communicate data with the memory devices 1310 (e.g., may transmit data to the memory devices 1310 and/or may receive data from the memory devices 1310).

The controller 1330 may include one or more hardware components (e.g., an analog circuit, a logic circuit, and/or the like) which are configured to perform operations described above and to be described below. In addition, the controller 1330 may include one or more processor cores. Operations of the controller 1330 described above and to be described below may be implemented in a program code of software and/or firmware, and processor core(s) of the controller 1330 may execute an instruction set of the program code. The processor core(s) of the controller 1330 may process various kinds of arithmetic operations and/or logical operations to execute the instruction set.

Figure 3:
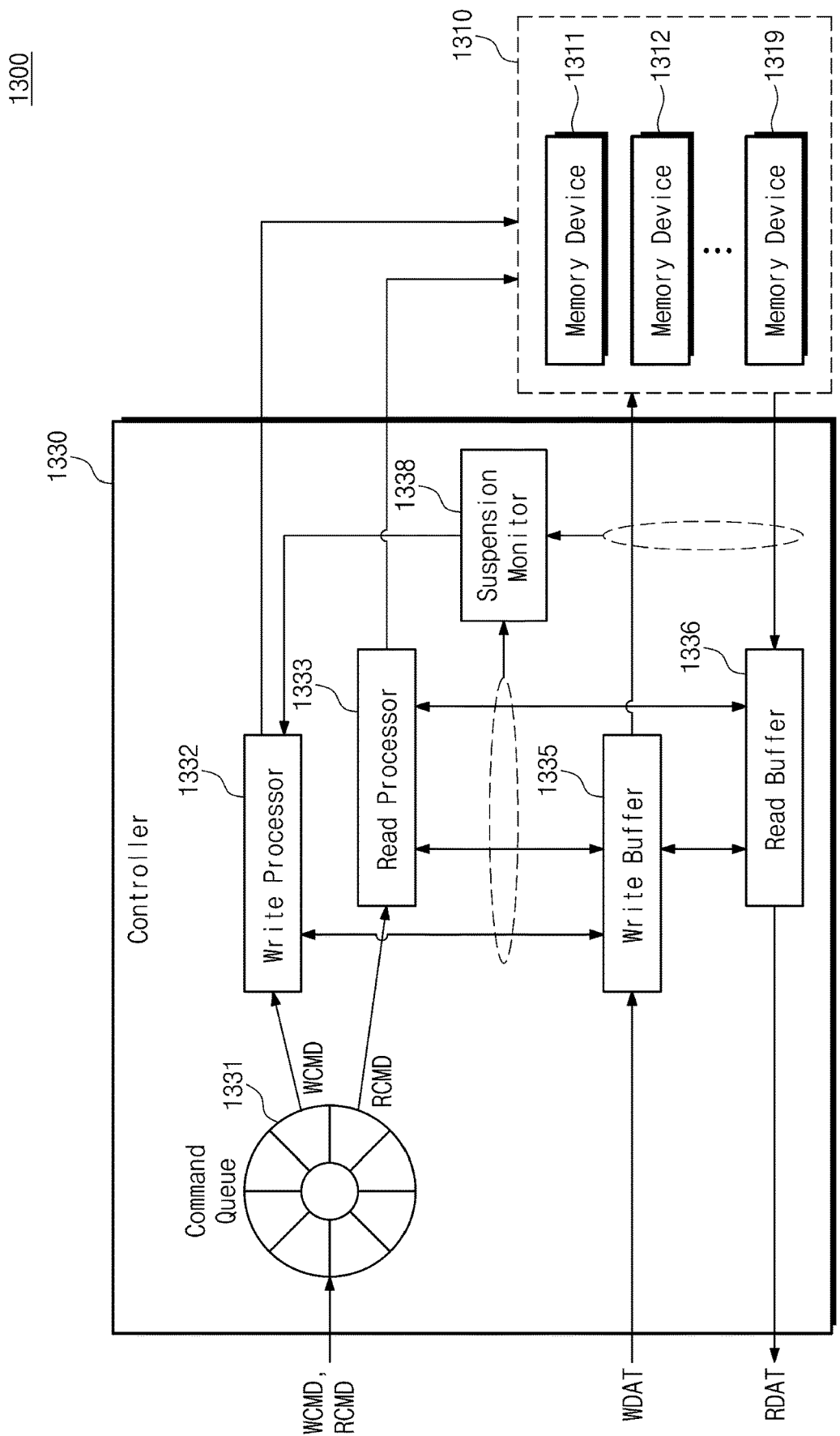
FIG. 3 is a block diagram illustrating an example configuration associated with a controller of FIG. 2.

FIG. 3 is a block diagram illustrating an example configuration associated with the controller 1330 of FIG. 2.

In some embodiments, the controller 1330 may include a command queue 1331, a write processor 1332, a read processor 1333, a write buffer 1335, a read buffer 1336, and a suspension monitor 1338. However, the configuration of the controller 1330 of FIG. 3 is provided to facilitate better understanding, and is not intended to limit the inventive concept. The controller 1330 may not include one or more of the components illustrated in FIG. 3 or may further include a component not illustrated in FIG. 3.

The controller 1330 may schedule a processing order of the commands WCMD and RCMD provided from the host 1100. The controller 1330 may queue the commands WCMD and RCMD in the command queue 1331 depending on the scheduled processing order. Depending on the scheduled processing order, the command WCMD may be processed by the write processor 1332, and the command RCMD may be processed by the read processor 1333.

The write buffer 1335 may store or buffer the write data WDAT provided from the host 1100. The write processor 1332 may control a write operation such that the write data WDAT directed by the command WCMD is transmitted to the memory devices 1310 from the write buffer 1335. Accordingly, the controller 1330 may process the command WCMD and the write data WDAT, and the write operation may be performed on the memory devices 1311, 1312, and 1319.

For example, when each of the memory devices 1311, 1312, and 1319 includes a flash memory, the write operation may be performed with a program unit size (e.g., a page size). For example, when a size of the write data WDAT is smaller than the program unit size, the write buffer 1335 may buffer the write data WDAT until unit data having the program unit size is accumulated. After the unit data having the program unit size is accumulated, the unit data including the write data WDAT may be transmitted to the memory devices 1310, and thus, may be stored in the memory devices 1311, 1312, and 1319.

The read processor 1333 may control a read operation such that the read data RDAT directed by the command RCMD is output to the host 1100. In some cases, the read data RDAT may be buffered in the write buffer 1335 (cache hit). In this case, under control of the read processor 1333, the read data RDAT may be provided to the host 1100 directly from the write buffer 1335 or through the read buffer 1336.

In some cases, the read data RDAT may be stored in the memory devices 1311, 1312, and 1319. In this case, under control of the read processor 1333, the read buffer 1336 may store or buffer the read data RDAT received from the memory devices 1310, and may provide the read data RDAT to the host 1100. Accordingly, the read operation may be performed on the memory devices 1311, 1312, and 1319, and the controller 1330 may process the command RCMD and the read data RDAT.

In some embodiments, operations of the write processor 1332 and the read processor 1333 may be implemented in a program code executable by a processor core of the controller 1330, and the command queue 1331 may be implemented in a cache inside a processor or a buffer outside a processor. In some example embodiments, the write processor 1332 and the read processor 1333 may be implemented in a hardware circuit configured to perform operations described in the present disclosure, and the command queue 1331 may be implemented in a memory accessible by the write processor 1332 and the read processor 1333.

In some embodiments, the controller 1330 may include a buffer memory for storing a variety of data used for an operation of the controller 1330. The write buffer 1335 and the read buffer 1336 may be implemented in the buffer memory of the controller 1330, or may be implemented in a separate memory independent of an operation of the controller 1330.

Meanwhile, an operation which is performed on the memory devices 1311, 1312, and 1319 under control of the controller 1330 may be suspended and resumed depending on a condition, which will be described below. The suspension monitor 1338 may monitor a frequency that an operation is suspended, that is, a frequency of operation suspension. The monitored frequency may indicate whether suspension of an operation is frequent or rare.

The monitored frequency may be referenced to adjust a manner of communicating data between the controller 1330 and the memory devices 1310. For example, the write processor 1332 and/or the read processor 1333 may throttle, with reference to the frequency of operation suspension monitored by the suspension monitor 1338, an amount of data transmitted to and/or from the memory devices 1310. Detailed embodiments will be described below.

The suspension monitor 1338 may refer to command transmission and/or data flow to monitor a frequency that an operation is suspended. For example, the write processor 1332 and/or the read processor 1333 may generate a suspend command to suspend an operation, and the suspension monitor 1338 may monitor a frequency that the operation is suspended, based on the suspend command being generated.

Alternatively, for example, the suspension monitor 1338 may monitor data flow between the write buffer 1335 (and/or the read buffer 1336) and the memory devices 1310. The suspension monitor 1338 may monitor a frequency that an operation is suspended, based on the data flow being suspended. Besides, the suspension monitor 1338 may be variously changed or modified to monitor a frequency that an operation is suspended.

For example, the frequency monitored by the suspension monitor 1338 may be associated with a count or a number of times that an operation is suspended. It may be understood that a suspension frequency is determined to be frequent when the count increases and is determined to be rare when the count decreases.

Alternatively, for example, the frequency monitored by the suspension monitor 1338 may be associated with time intervals between time points when operations are suspended. It may be understood that the frequency is determined to be frequent when a time interval gets shorter and is determined to be rare when the time interval gets longer. In some cases, both the count and the time interval may be measured. Besides, the frequency that an operation is suspended may be measured differently from the foregoing methods, not being limited thereto.

In some embodiments, the suspension monitor 1338 may be implemented in a hardware circuit (e.g., a counter circuit, a timer circuit, a signal sensor, and/or the like) configured to measure a frequency that an operation is suspended. Alternatively, the suspension monitor 1338 may be implemented in a software module such as a program code executable by a processor core of the controller 1330. The hardware circuit and/or the software module of the suspension monitor 1338 may operate to measure a value (e.g., a count, a time interval, and/or the like) associated with a frequency.

Figure 4:
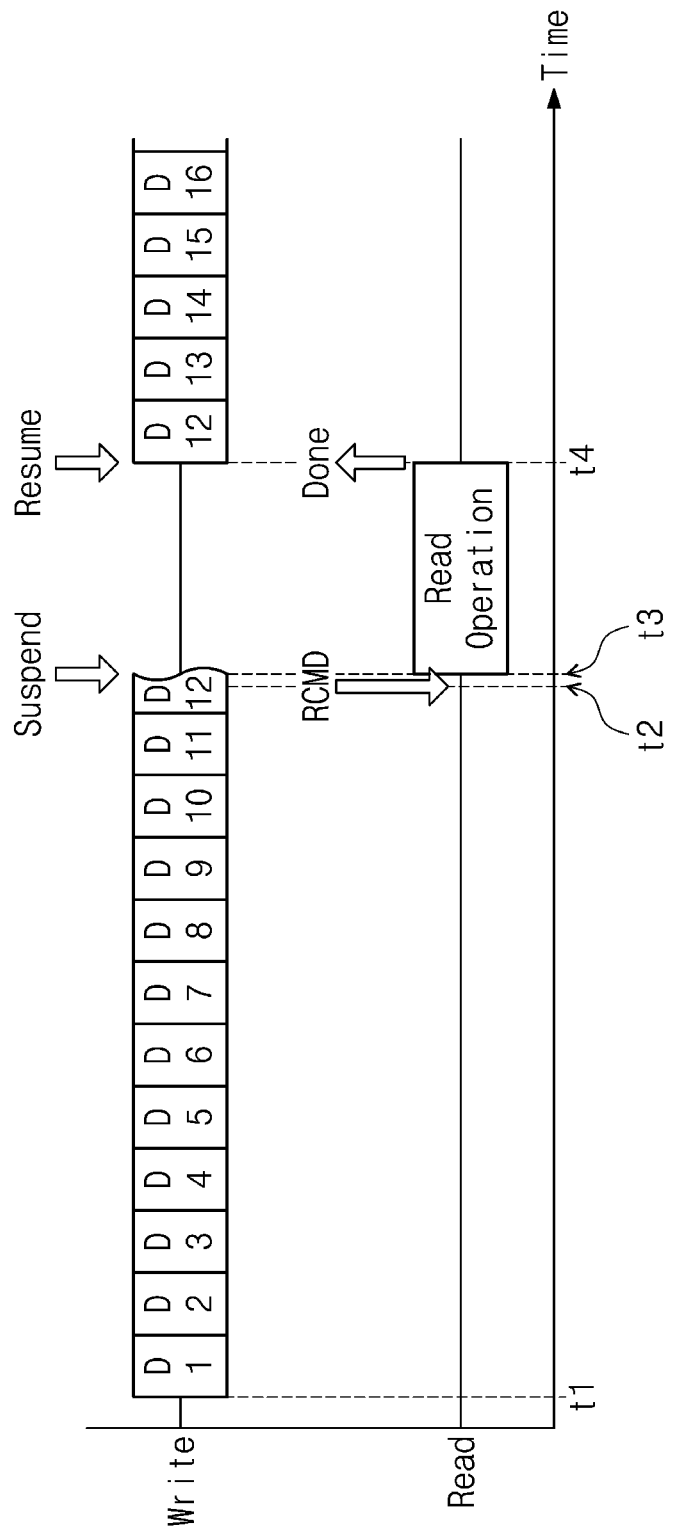
FIGS. 4 and 5 are timing diagrams for describing example operations of a controller of FIG. 3.

FIG. 4 is a timing diagram for describing an example operation of the controller 1330 of FIG. 3. For example, FIG. 4 illustrates a write operation and a read operation which are performed on the memory devices 1311, 1312, and 1319 under control of the controller 1330.

At time point t1, under control of the write processor 1332 of the controller 1330, data of the write buffer 1335 may start to be transmitted to the memory devices 1310. Accordingly, a write operation for storing write data may be performed on the memory devices 1311, 1312, and 1319. The data transmitted from the controller 1330 to the memory devices 1310 may include data D1 to D16.

Each of the data D1 to D16 may have an output unit size which is output from the controller 1330 for the write operation. Alternatively, each of the data D1 to D16 may have a program unit size of a program operation which is performed at the memory devices 1311, 1312, and 1319. In this regard, each of the data D1 to D16 may be understood as unit data.

The data for the write operation may include one or more unit data. In some cases, the controller 1330 may transmit a plurality of unit data successively to the memory devices 1310 to improve performance of the write operation. In the example of FIG. 4, the controller 1330 may transmit the data D1 to D11 successively to the memory devices 1310. Afterwards, the data D12 for the write operation may start to be transmitted from the controller 1330 to the memory devices 1310.

While the data D12 is transmitted, at time point t2, a command RCMD for a read operation may be requested to be processed. When the read operation is requested, at time point t3, the controller 1330 may suspend the write operation of transmitting the data D12. In addition, under control of the read processor 1333 of the controller 1330, the read operation may be performed such that read data directed by the command RCMD at time point t2 is output from the memory devices 1310.

For example, the read data may have to be used by the host 1100 within a short time. Accordingly, responding rapidly to the read request of the command RCMD may be advantageous to improve quality of storage service for the host 1100. On the other hand, the data D12 to D16 for the write operation may be buffered in the write buffer 1335 without loss, and thus, delaying the write operation for a short time period may be acceptable.

In this regard, the controller 1330 may temporarily suspend the write operation, and may perform the read operation to provide a fast read response. The suspension monitor 1338 may monitor that the write operation is suspended at time point t3. For example, the suspension monitor 1338 may increase a suspension count and/or may measure a time interval between a time point at a previous suspension occurred and time point t3, and thus, may monitor a frequency that the write operation is suspended.

At time point t4, the read operation may be completed. After the read operation is completed, the suspended write operation may be resumed. The data D12 has been partially transmitted to the memory devices 1310, but a partial program operation may degrade reliability of the data D12. Accordingly, under control of the write processor 1332, the whole portion of the data D12 may be transmitted to the memory devices 1310 for the write operation. Afterwards, the data D13 to D16 may be transmitted to the memory devices 1310.

The write operation and the read operation have been described with reference to FIG. 4, but the embodiment is not limited thereto. The read operation may be replaced with another operation (e.g., a search operation, a security operation, or the like) which has a relatively higher priority or which is required to be processed within a short time period, and the write operation may be replaced with another operation (e.g., an internal management operation, a delete operation, or the like) which has a relatively lower priority or which is acceptable to be processed later.

However, the following descriptions will be provided with regard to the write operation and the read operation to facilitate better understanding. It may be readily understood that the embodiment may be variously changed or modified with regard to other operations without being limited to the following descriptions.

Figure 5:
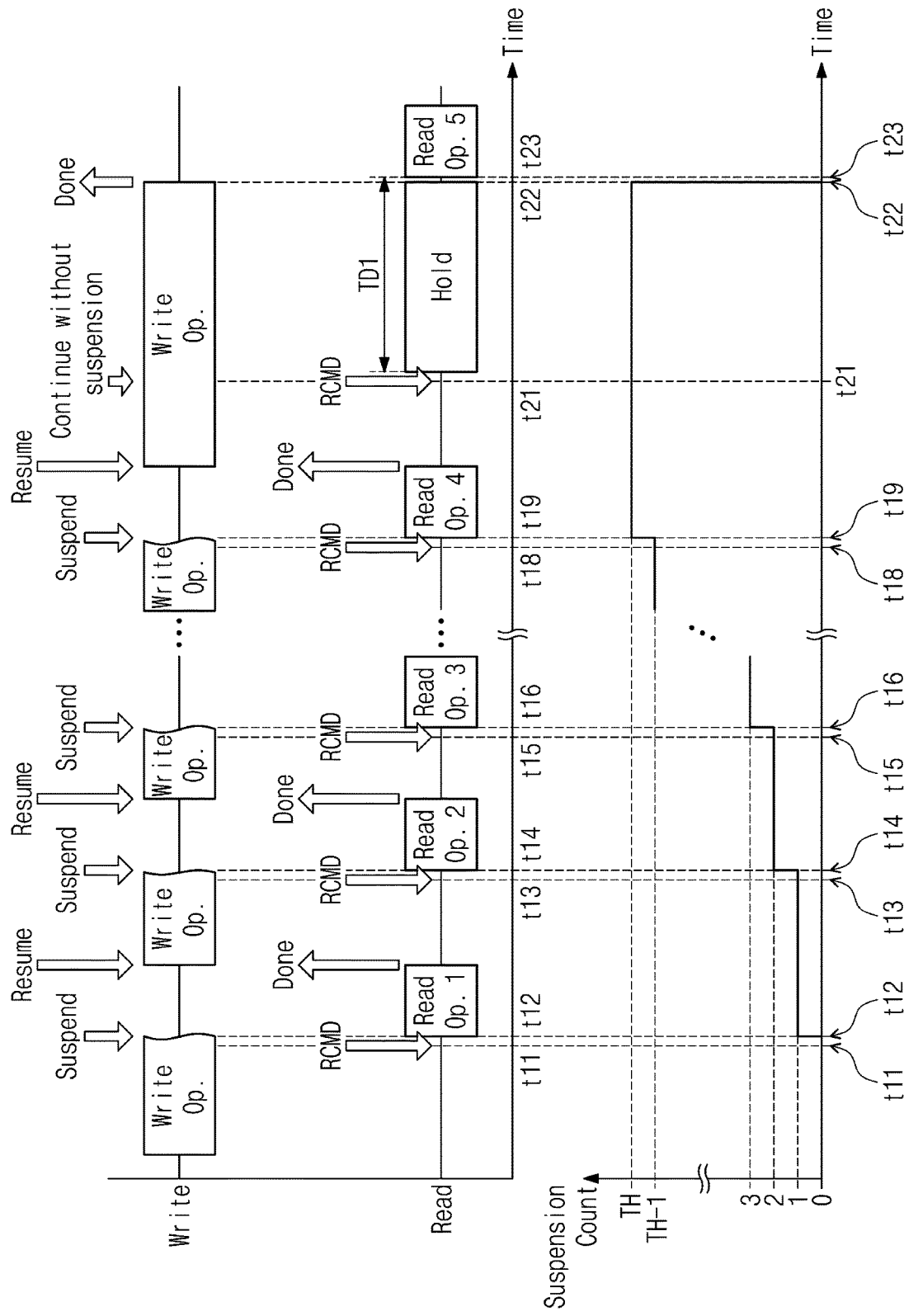

FIG. 5 is a timing diagram for describing an example operation of the controller 1330 of FIG. 3.

While a write operation is performed on the memory devices 1310, a read operation on the memory devices 1310 may be requested at time point t11. In this case, the write operation may be suspended at time point t12 such that the read operation is completed earlier than the write operation. After the read operation is completed, the write operation may be resumed.

For example, as the write operation is suspended at time point t12, the controller 1330 may increase a suspension count by one (1). For example, the suspension monitor 1338 may measure the suspension count such that the suspension count increases by one in response to the suspension of the write operation.

In response to read requests at time point t13, t15, and t18, the write operations may be suspended at time points t14, t16, and t19, and thus, read operations may be completed earlier. For example, whenever a write operation is suspended, the suspension count may increase by one. At time t19, the suspension count may reach a maximum suspension count TH which is set in the suspension monitor 1338 or any component of the controller 1330.

Suspending a write operation and completing a read operation earlier than the write operation may be advantageous to provide a fast read response. However, when suspensions and resumptions of a program operation on the memory devices 1311, 1312, and 1319 are frequently repeated, reliability of data stored in the memory devices 1311, 1312, and 1319 may be degraded, and deterioration of memory elements of the memory devices 1311, 1312, and 1319 may become severe.

In some implementations, the controller 1330 or the suspension monitor 1338 may set the maximum suspension count TH for which the suspension is allowable. When the suspension count reaches the maximum suspension count TH, the suspension of the write operation may not be allowed after time point t19, to prevent the reliability of data from being degraded and to prevent the memory elements from being deteriorated.

While the resumed write operation is performed, at time point t21, a read operation may be requested. However, as the suspension count reaches the maximum suspension count TH, the write processor 1332 may continuously process the write operation without suspension. Meanwhile, the read operation may not be performed and may be held. After the write operation is completed at time point t22, the held read operation may start at time point t23. As the write operation is completed at time point t22, the suspension count may be reset.

The suspension count may be managed with regard to one write operation. The suspension count may increase while a series of data for one write operation are transmitted to the memory devices 1310. The suspension count may be reset when the series of data are completely transmitted to the memory devices 1310. Herein, the reset may mean that the suspension count is restored or initialized to a state or a value before the write operation is started.

When the maximum suspension count TH is used, suspensions and resumptions of the program operation may be prevented from being frequently repeated. However, a read operation requested after the suspension count reaches the maximum suspension count TH may held for a long time (e.g., during a time period TD1). As a response to the read request is delayed, quality of service may be degraded.

In addition, as the completion of the write operation is delayed due to a suspended write operation, a probability that a later read response is delayed may further increase. A delay of the write operation may cause a delay of the read operation. As a result, when the suspension count increases, a time required for a read response may also increase.

Figure 6:
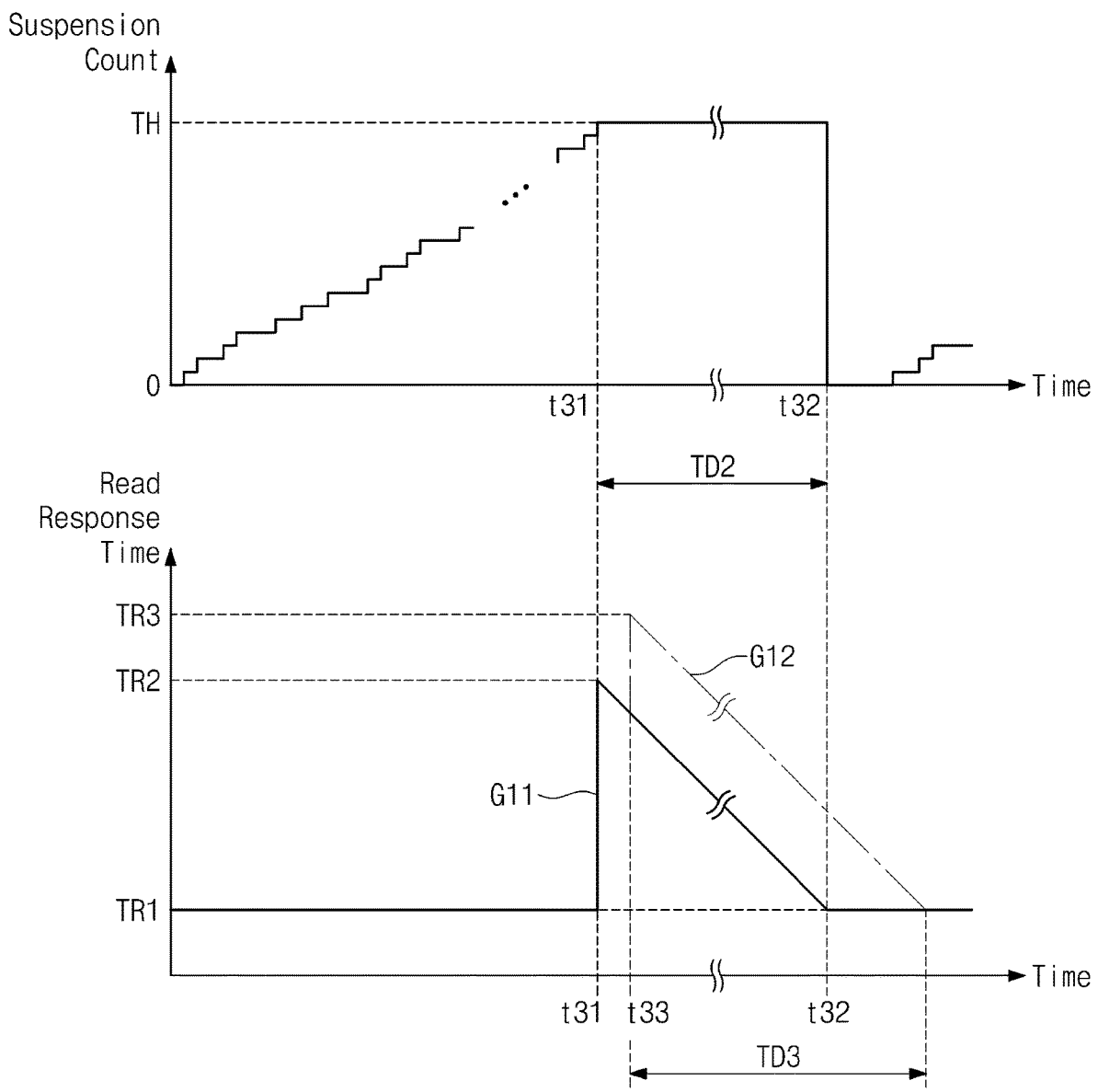
FIG. 6 is a graph for describing a characteristic associated with an operation of FIG. 5.

FIG. 6 is a graph for describing a characteristic associated with the operation of FIG. 5.

According to the operation described with reference to FIG. 5, in FIG. 6, suspensions of the write operations may occur intensively before time point t31. The suspension count for the write operation may reach the maximum suspension count TH at time point t31. Afterwards, as the write operation is completed, the suspension count may be reset at time point t32. A time period TD2 in which the suspension count remains at the maximum suspension count TH may affect a response time for the read request (e.g., may increase a time length required for the read response).

For example, referring to graph G11, a response time before time point t31 may require a time length TR1, while a response for a read operation requested at time point t31 may require a time length TR2 which is greater than the time length TR1. The read operation requested at time point t31 may be delayed as much as the time period TD2 in the worst case.

For example, referring to graph G12, when an additional read operation is requested at time point t33, the additional read operation may be further held until the read operation requested at time point t31 is completed. Accordingly, a response for the additional read operation may require a time length TR3 which is greater than the time length TR2. The additional read operation requested at time point t33 may be delayed as much as the time period TD3 in the worst case.

As such, a write suspension intended to provide a fast read response may make a later read response delayed and late. Accordingly, embodiments of the inventive concept provide a controller which may throttle or adjust an amount of data based on a suspension frequency of an operation (e.g., a write operation) of a low priority, to provide a fast response with regard to an operation (e.g., a read operation) of a high priority.

Figure 7:
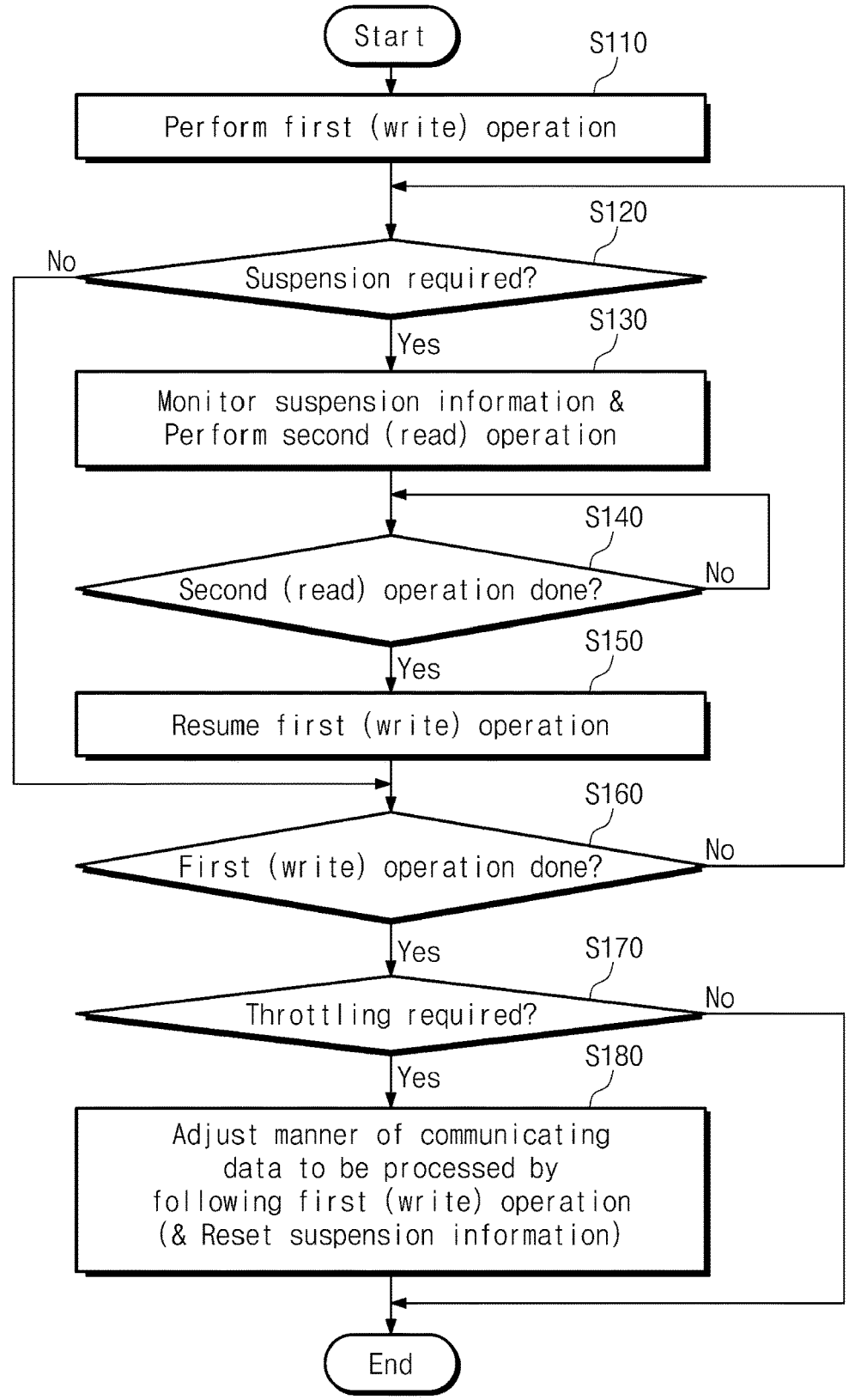
FIGS. 7 and 8 are flowcharts describing example operations of a controller of FIG. 3 according to some example embodiments.

FIG. 7 is a flowchart describing an example operation of the controller 1330 of FIG. 3 according to some embodiments. FIG. 7 describes an overall operation flow according to some embodiments.

Under control of the controller 1330 (e.g., the write processor 1332), a first operation (e.g., a write operation) may be performed on the memory devices 1310 (S110). The controller 1330 may communicate data with the memory devices 1310 with regard to the write operation, and may control the memory devices 1310 such that the write operation is performed on the memory devices 1310.

The controller 1330 may determine whether a suspension of the write operation is required (S120). When the suspension of the write operation is not required (No in S120), the write operation may be continuously performed. However, while the write operation is performed, when a second operation on the memory devices 1310 is requested and a priority of the second operation is higher than a priority of the write operation, the controller 1330 may determine that the suspension of the write operation is required (Yes in S120).

In this case, the controller 1330 may suspend the write operation, and communication of data for the write operation between the controller 1330 and the memory devices 1310 may be suspended. The suspension monitor 1338 may monitor a frequency that the write operation is suspended, based on the suspension of the write operation (S130).

In addition, the second operation (e.g., a read operation) may be performed on the memory devices 1310 under control of the controller 1330 (e.g., the read processor 1333) (S130). The controller 1330 may control the memory devices 1310 such that the read operation is completed earlier than the suspended write operation.

When the read operation is not completed (No in S140), the read operation may be continuously performed. While the read operation is performed, the controller 1330 may communicate data with the memory devices 1310 with regard to the read operation. After the read operation is completed (Yes in S140), the suspended write operation may be resumed (S150).

When the write operation is not completed (No in S160), the write operation may be continuously performed, and it may be determined whether the suspension of the write operation is required again (S120). When the data for the write operation is completely communicated with the memory devices 1310, the write operation may be completed (Yes in S160).

The controller 1330 may determine, based on the frequency monitored by the suspension monitor 1338, whether it is required to throttle an amount of data to be communicated between the controller 1330 and the memory devices 1310 in a following first operation (e.g., a following write operation subsequent to the write operation of S110) (S170). The throttling may be provided to adjust the amount of data such that a suspension frequency does not sharply increase during all write operations including the write operation of S110 and the following write operation, which will be described below.

When the throttling is required (Yes in S170), the controller 1330 (e.g., the write processor 1332) may adjust, based on the frequency that the write operation of S110 is suspended, a manner of communicating data, which is to be processed by the following write operation, with the memory devices 1310 (S180). Adjusting the communication manner will be described below. When the throttling is not required (No in S170), the communication manner may not change.

For example, when all the write operations including the write operation of S110 and the following write operation are completed, the frequency monitored by the suspension monitor 1338 with regard to the write operation may be reset (S180). However, before all the write operations are completed, the monitored frequency may not be reset.

Figure 8:
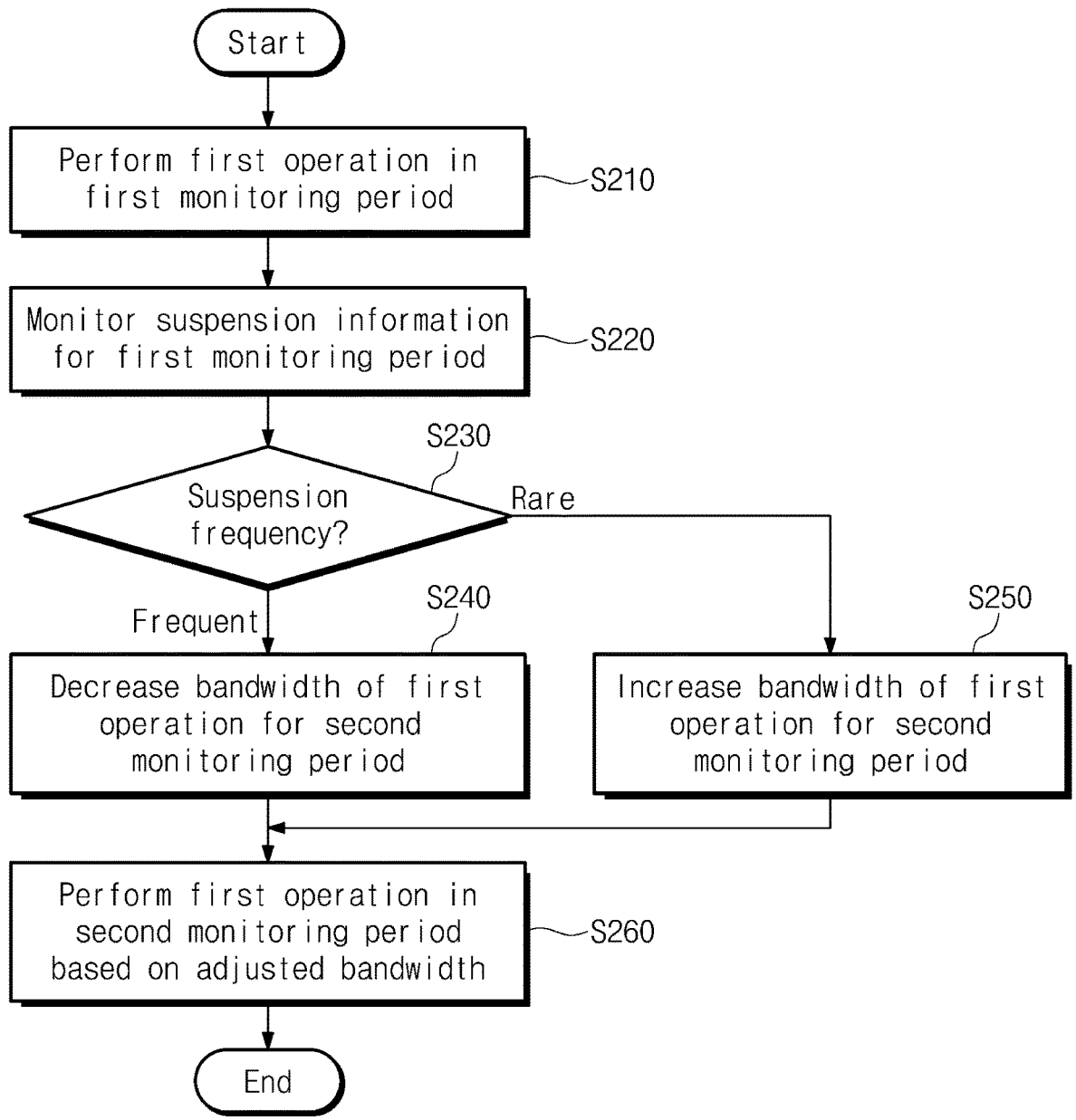

FIG. 8 is a flowchart describing an example operation of the controller 1330 of FIG. 3 according to some embodiments. FIG. 8 describes an operation over time in some embodiments.

Under control of the controller 1330 (e.g., the write processor 1332), a first operation (e.g., a write operation) may be performed in a first monitoring time period (S210). As the write operation is performed, the controller 1330 may communicate data with the memory devices 1310 during the first monitoring time period.

As described above, when a second operation (e.g., a read operation) of a high priority is requested while the write operation is performed, the write operation may be temporarily suspended, and then, may be resumed later. The suspension monitor 1338 may monitor a frequency that the write operation is suspended (e.g., a frequency that communication of write data between the controller 1330 and the memory devices 1310 is suspended) in the first monitoring time period (S220).

The controller 1330 may determine, with reference to the monitored frequency, whether the write operation is suspended frequently or rarely (S230). Determining whether the suspension is frequent or rare will be described later.

After the write operation of S210 repeats suspension and resumption, and then, is completed, under control of the controller 1330 (e.g., the write processor 1332), a following first operation (e.g., a following write operation subsequent to the write operation of S210) may be performed on the memory devices 1310 in a second monitoring time period after the first monitoring time period (S260).

However, before the second monitoring time period begins, the controller 1330 may adjust a manner of performing the following write operation in the second monitoring time period, based on the determined result at operation S230 (S240 and S250). For example, the write processor 1332 of the controller 1330 may adjust, based on the frequency that the preceding write operation of S210 is suspended, an amount of data communicated with the memory devices 1310 per unit time with regard to the following write operation.

In the example of FIG. 8, the write processor 1332 of the controller 1330 may adjust a bandwidth of the following write operation to adjust the amount of data (e.g., write data) communicated between the controller 1330 and the memory devices 1310 in the following write operation. Herein, the bandwidth may mean an amount of communicated data per unit time or speed at which data is transmitted per unit time.

For example, when it is determined at operation S230 that the preceding write operation of S210 has been frequently suspended, the controller 1330 may decrease the bandwidth of the following write operation (S240). In this case, the amount of data communicated in the following write operation may decrease, and a frequency that the following write operation is suspended may decrease.

On the other hand, when it is determined at operation S230 that the preceding write operation of S210 has been rarely suspended, the controller 1330 may increase the bandwidth of the following write operation (S250). Accordingly, the amount of data communicated in the following write operation may increase, and performance of the following write operation may be improved. In this case, the frequency that the following write operation is suspended may somewhat increase. However, the preceding write operation of S210 may be rarely suspended in the first monitoring time period, and thus, it may be acceptable that a suspension frequency for the following write operation somewhat increases.

Afterwards, the following write operation of the second monitoring time period may be performed based on the adjusted bandwidth (S260). As the following write operation is performed, the controller 1330 may communicate data with the memory devices 1310 during the second monitoring time period.

In this manner, while first operations (e.g., write operations) are successively performed, when second operations (e.g., read operations) of a high priority are sometimes requested, the controller 1330 may control the memory devices 1310, such that the first operations are suspended and resumed, to perform and complete the second operations earlier than the first operations. Accordingly, data for the second operations may be processed earlier than data for the first operations.

Herein, when the first operations (e.g., the write operations) are successively performed, a communication manner for a following first operation (e.g., the following write operation of S260) may be adjusted under control of the controller 1330 (e.g., the write processor 1332), based on a frequency that a preceding first operation (e.g., the preceding write operation of S210) is suspended.

For example, when frequencies that preceding first operations are suspended become frequent or increase, a manner of communicating data between the controller 1330 and the memory devices 1310 in the following first operation may be adjusted to decrease an amount of communicated data per unit time. On the other hand, when the frequencies that the preceding first operations are suspended become rare or decrease, the manner of communicating data between the controller 1330 and the memory devices 1310 in the following first operation may be adjusted to increase the amount of communicated data per unit time.

The controller 1330 may adjust the amount of data or the bandwidth with reference to the frequency monitored by the suspension monitor 1338, such that the data for the following first operation is communicated with the memory devices 1310 as much as an amount or a bandwidth determined based on the monitored frequency. As such, throttling the amount of data or the bandwidth may prevent the suspension of the first operation from intensively occurring during earlier time periods in all the first operations including the preceding first operation and the following first operation.

Figure 9:
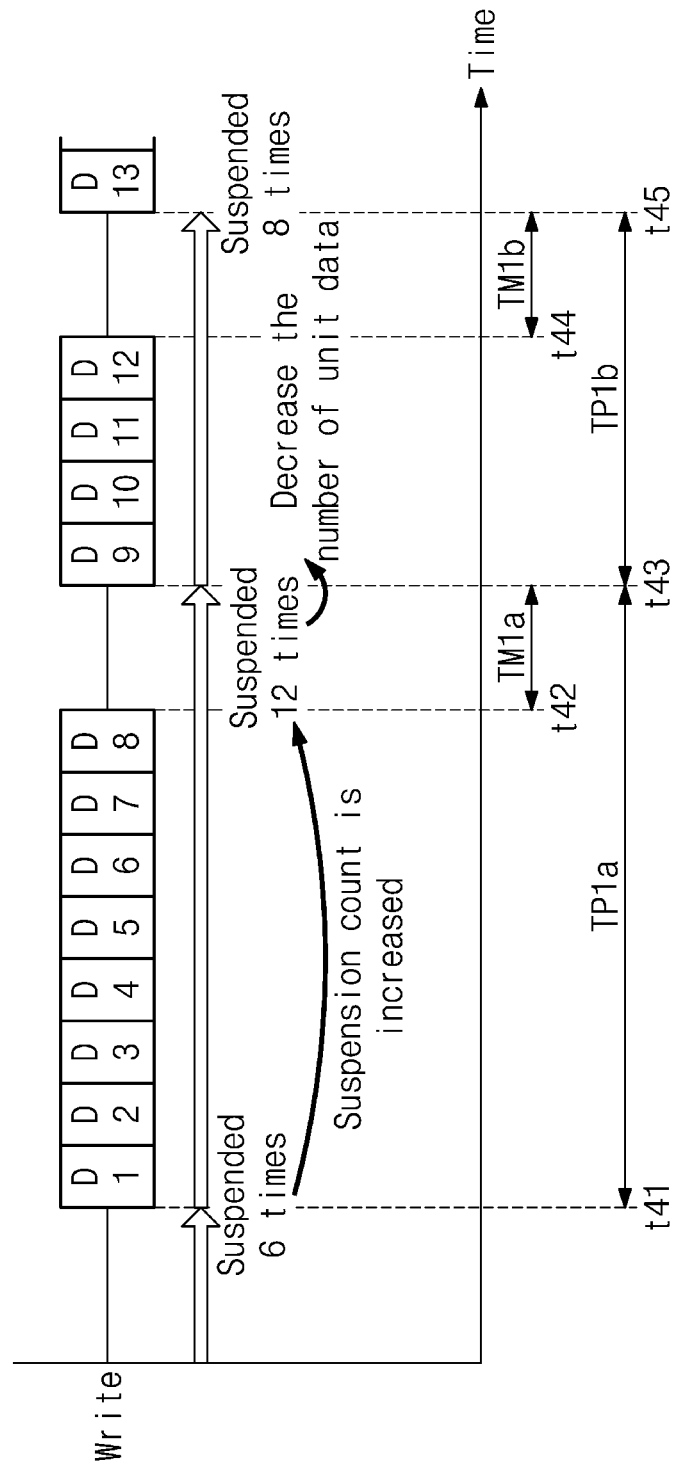
FIGS. 9 and 10 are timing diagrams for describing an example operation of a controller of FIG. 3 according to some example embodiments.
Figure 10:
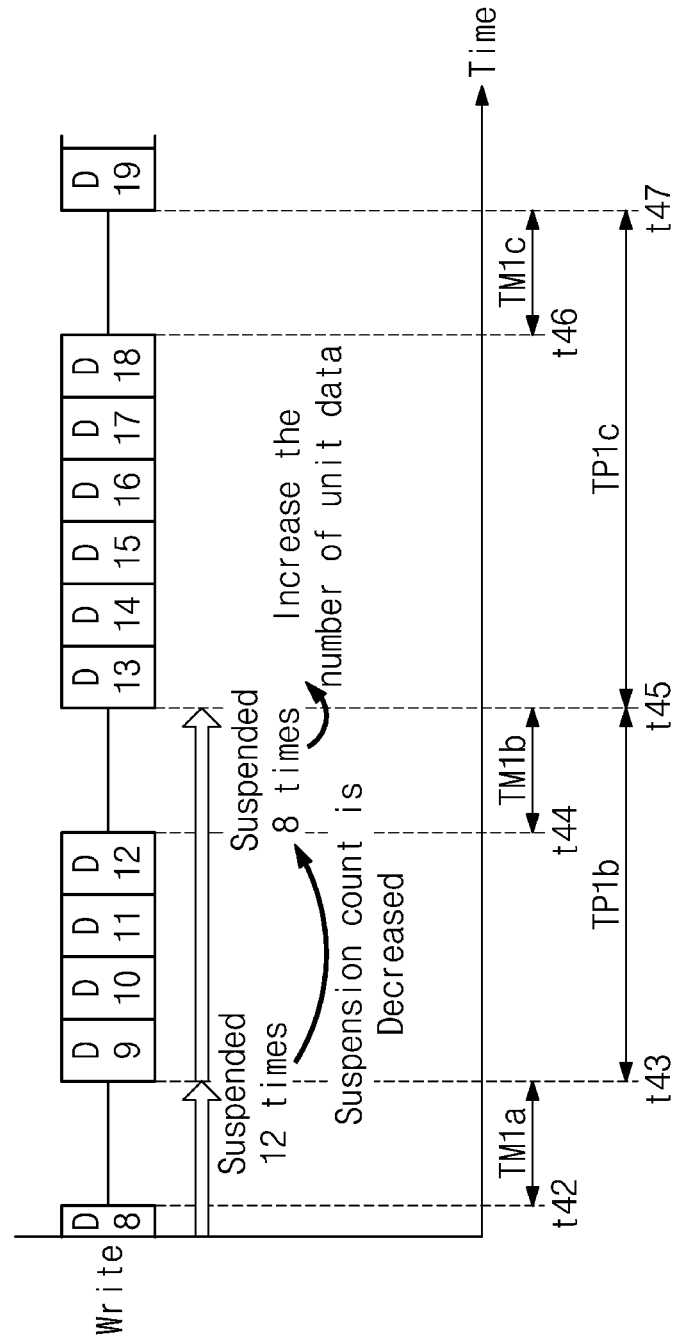

FIGS. 9 and 10 are timing diagrams for describing an example operation of the controller 1330 of FIG. 3 according to some embodiments.

One write operation may be divided into a plurality of write operations. Data for each of the divided write operations may include one or more unit data. In the example of FIGS. 9 and 10, a divided write operation may be associated with data D1 to D8, and data for a next divided write operation may include data D9 to D12. Another divided write operation may be performed to store data D13 to D18. Here, one divided write (read) operation may be an operation to be performed or executed by one write (read) command WCMD (RCMD) described above in reference to FIG. 2.

The controller 1330 may schedule and process the divided write operations individually and independently. However, the controller 1330 may regard the divided write operations as one original write operation, and may monitor a suspension frequency with regard to the divided write operations. After all the divided write operations are completed, the suspension frequency may be reset.

It may be understood that the divided write operations include preceding write operations and following write operations subsequent to respective ones of the preceding write operations. In the example of FIGS. 9 and 10, a write operation for the data D1 to D8 may be a preceding write operation, and a write operation for the data D9 to D12 may be a following write operation subsequent to the preceding write operation.

On the other hand, when the write operation for the data D9 to D12 is a preceding write operation, a write operation for the data D13 to D18 may be a following write operation subsequent to the write operation for the data D9 to D12. A preceding write operation and a following write operation may be associated with a relative order between the divided write operations.

Referring to FIG. 9, in some embodiments, the suspension monitor 1338 may monitor a count that a write operation is suspended. For example, the suspension monitor 1338 may has measured that a divided write operation before time point t41 has been suspended six (6) times.

The write operation for the data D1 to D8 may start at time point t41, and may be completed at time point t42. In the meantime, between time points t41 and t42, read operations may be sometimes requested, and the write operation may repeat to be suspended and resumed. For example, the suspension monitor 1338 may measure that the write operation is suspended twelve (12) times during a monitoring time period TP1a between time points t41 and t43 that the write operation is performed.

The write processor 1332 may adjust, based on the measured suspension count, a manner of communicating data with the memory devices 1310, to perform the write operation for the data D9 to D12. For example, the write processor 1332 may adjust the communication manner based on a relationship between the suspension count measured before time point t41 and the suspension count measured between time points t41 and t43.

In some embodiments, adjusting the communication manner may include adjusting an amount of data to be communicated between the controller 1330 and the memory devices 1310. For example, the write processor 1332 may adjust the number of unit data for each divided write operation to throttle an amount of data to be communicated in each divided write operation.

In the example of FIG. 9, the suspension count (e.g., 12 times) of the write operation for the data D1 to D8 may be greater than the suspension count (e.g., 6 times) of the write operation before time point t41 (the suspension count increases from 6 to 12). This may mean that a frequency that the write operation for the data D1 to D8 is suspended is more frequent than a frequency that the write operation before time point t41 is suspended. To decrease the suspension frequency, the write processor 1332 may decrease the number of unit data such that an amount of data communicated with the memory devices 1310 per unit time decreases in a next divided write operation.

For example, a decrease in the number of unit data may be selected to be inversely proportional to an increase in the suspension count. In the example of FIG. 9, the suspension count during the monitoring time period TP1a increases twice, compared to the suspension count before time point t41, as eight (8) unit data D1 to D8 are communicated, and thus, data for a following write operation may be adjusted to include four ($=8 \times \frac{1}{2}$) unit data D9 to D12. However, this example is provided to facilitate better understanding, and is not intended to limit the present disclosure.

Afterwards, the write operation for the data D9 to D12 may start at time point t43, and may be completed at time point t44. In the write operation between time point t43 and time point t44, the data D9 to D12 may be transmitted to the memory devices 1310 as much as an amount determined based on the suspension frequency of the preceding write operation between time point t41 and time point t42. In the meantime, between time points t43 and t44, read operations may be sometimes requested, and the write operation may repeat to be suspended and resumed.

For example, when the number of unit data for a write operation decreases, the amount of data transmitted from the write buffer 1335 to the memory devices 1310 may decrease. In this case, the data buffered in the write buffer 1335 may not be completely output, but the buffered data may partially remain in the write buffer 1335 after the controller 1330 completes data communication for the write operation.

For example, the suspension monitor 1338 may measure that a write operation is suspended eight (8) times during a monitoring time period TP1b between time points t43 and t45 in which the write operation is performed. Referring to FIG. 10, the write processor 1332 may adjust the number of unit data for a next write operation based on a relationship between the suspension count (e.g., 12 times) measured between time point t41 and time point t43 and the suspension count (e.g., 8 times) measured between time point t43 and time point t45.

In the example of FIG. 10, the suspension count (e.g., 8 times) of the write operation for the data D9 to D12 may be smaller than the suspension count (e.g., 12 times) of the write operation between time point t41 and time point t43 (the suspension count decreases from 12 to 8). This may mean that a frequency that the write operation for the data D9 to D12 is suspended is rarer than a frequency that the write operation between time point t41 and time point t43 is suspended.

To improve performance, the write processor 1332 may increase the number of unit data such that an amount of data communicated with the memory devices 1310 per unit time increases in a next divided write operation. For example, the suspension count has decreased by two-thirds ($\frac{2}{3}$) as four unit data D9 to D12 are communicated, and thus data for the next write operation may be adjusted to include six ($=4 \times \frac{3}{2}$) unit data D13 to D18.

Afterwards, the write operation for the data D13 to D18 may start at time point t45, and may be completed at time point t46. In the write operation between time point t45 and time point t46, the data D13 to D18 may be transmitted to the memory devices 1310 as much as an amount determined based on the suspension frequency of the preceding write operation between time points t43 and t45.

The suspension monitor 1338 may measure a suspension count of a write operation during a monitoring time period TP1c between time points t45 and t47. The write processor 1332 may throttle or adjust, based on the measured suspension count, a data amount (e.g., the number of unit data) for a following write operation associated with the data D19.

Referring to FIGS. 9 and 10, as the divided write operations are performed, margin time intervals TM1a, TM1b, and TM1c may be provided between the divided write operations. For example, the controller 1330 may schedule one or more read operations such that a read operation is performed in the margin time intervals TM1a, TM1b, and TM1c.

A write operation may not be performed in the margin time intervals TM1a, TM1b, and TM1c. Accordingly, in the margin time intervals TM1a, TM1b, and TM1c, a read operation may be performed without a suspension of a write operation. As a read operation is performed in the margin time intervals TM1a, TM1b, and TM1c, a suspension frequency (e.g., a suspension count) may not change.

For example, a read operation may be performed in the margin time interval TM1b between time points t44 and t45. The controller 1330 may control the memory devices 1310 such that the read operation is performed without suspending the write operation for the data D9 to D12 and without suspending the write operation for the data D13 to D18. Accordingly, while the read operation is performed, a suspension count measured by the suspension monitor 1338 may not change.

Performing a read operation in the margin time intervals TM1a, TM1b, and TM1c may not require a suspension of a write operation. Accordingly, a time taken for a suspension frequency to reach the maximum suspension frequency TH may be delayed.

In addition, as will be described below, as the controller 1330 throttles or adjusts a data amount with regard to each divided write operation, suspensions of individual divided write operations may be distributed over all the write operations. Accordingly, suspensions of the write operations may be prevented from intensively occurring during earlier time periods.

As a result, the delay of the read operation described with reference to FIG. 5 may be prevented. Moreover, performing a read operation when the margin time intervals TM1a, TM1b, and TM1c are given may be helpful to provide a fast read response.

Meanwhile, in some cases, a read operation of the margin time intervals TM1a, TM1b, and TM1c may not be required, and may not be scheduled. In this case, the margin time intervals TM1a, TM1b, and TM1c may not be provided, and write operations may be performed successively without the margin time intervals TM1a, TM1b, and TM1c.

FIG. 11 is a table for describing an example operation of the controller 1330 of FIG. 3 according to some embodiments.

In the example operation described with reference to FIGS. 9 and 10, throttling or adjusting a data amount may be performed every monitoring time period. However, in some cases, a slight change of a suspension count of a preceding write operation may not greatly affect performance and reliability. Accordingly, in some embodiments, the controller 1330 may throttle or adjust a data amount when a suspension count becomes out of a given count range or when a change in a suspension count exceeds a reference count.

In this regard, FIG. 11 illustrates an example relationship between a suspension count range and the number of unit data included in data for a write operation. For example, when a suspension count of a preceding write operation is 10, data for a following write operation may include fifteen (15) unit data. While the suspension count of the preceding write operation changes between 0 to 20, the number of unit data included in the data for the following write operation may be maintained at 15 without a change.

However, when the suspension count of the preceding write operation is out of the suspension count range between 0 and 20 and increases to 30, the number of unit data included in the data for the following write operation may decrease from 15 to 5. In this manner, when a suspension count of a preceding write operation is out of a current suspension count range, the controller 1330 may adjust the number of unit data included in data for a following write operation.

Numerical values illustrated in the table of FIG. 11 are provided to facilitate better understanding, and are not intended to limit the embodiment. The suspension count interval and the number of unit data may be variously changed or modified. For example, when a width of the suspension count range becomes narrow, the controller 1330 may operate more sensitively to a change in a suspension count of a preceding write operation. On the other hand, when a width of a suspension count interval becomes wide, influence of throttling on operation performance may decrease.

In some cases, widths of suspension count ranges may be selected to be different from each other. For example, suspension count ranges may be configured such that a width of a suspension count range requiring a sensitive response is narrow and a width of a suspension count range not requiring a sensitive response is wide. As such, the suspension count range and the number of unit data may be variously changed or modified to be suitable to a requirement.

In some cases, instead of selecting a suspension count range having fixed upper and lower limits, the controller 1330 may throttle or adjust a data amount when a variation in a suspension count exceeds a reference count (e.g., when a suspension count increases or decreases from a current value by 10 or more) or when a change rate of a suspension count exceeds a reference percentage (e.g., when a suspension count increases or decreases from a current value by 10% or more).

For example, the controller 1330 may manage a relationship between a suspension count and the number of unit data in a form of a table (e.g., a look-up table). Alternatively, the controller 1330 may include a hardware circuit or a program code configured to calculate the number of unit data based on a given suspension count.

In some embodiments, the suspension monitor 1338 may provide the write processor 1332 with a monitored suspension frequency (e.g., a measured suspension count) periodically (e.g., every monitoring time period) such that the write processor 1332 throttles or adjusts a data amount.

In some embodiments, regardless of a monitoring time period, the suspension monitor 1338 may provide a measured suspension count to the write processor 1332 when the measured suspension count satisfies a throttling condition. For example, the throttling condition may be satisfied when a variation in a suspension count exceeds a reference count or when a change rate of a suspension count exceeds a reference percentage. In this case, the controller 1330 may throttle or adjust a data amount dynamically in response to the throttling condition being satisfied.

Figure 12:
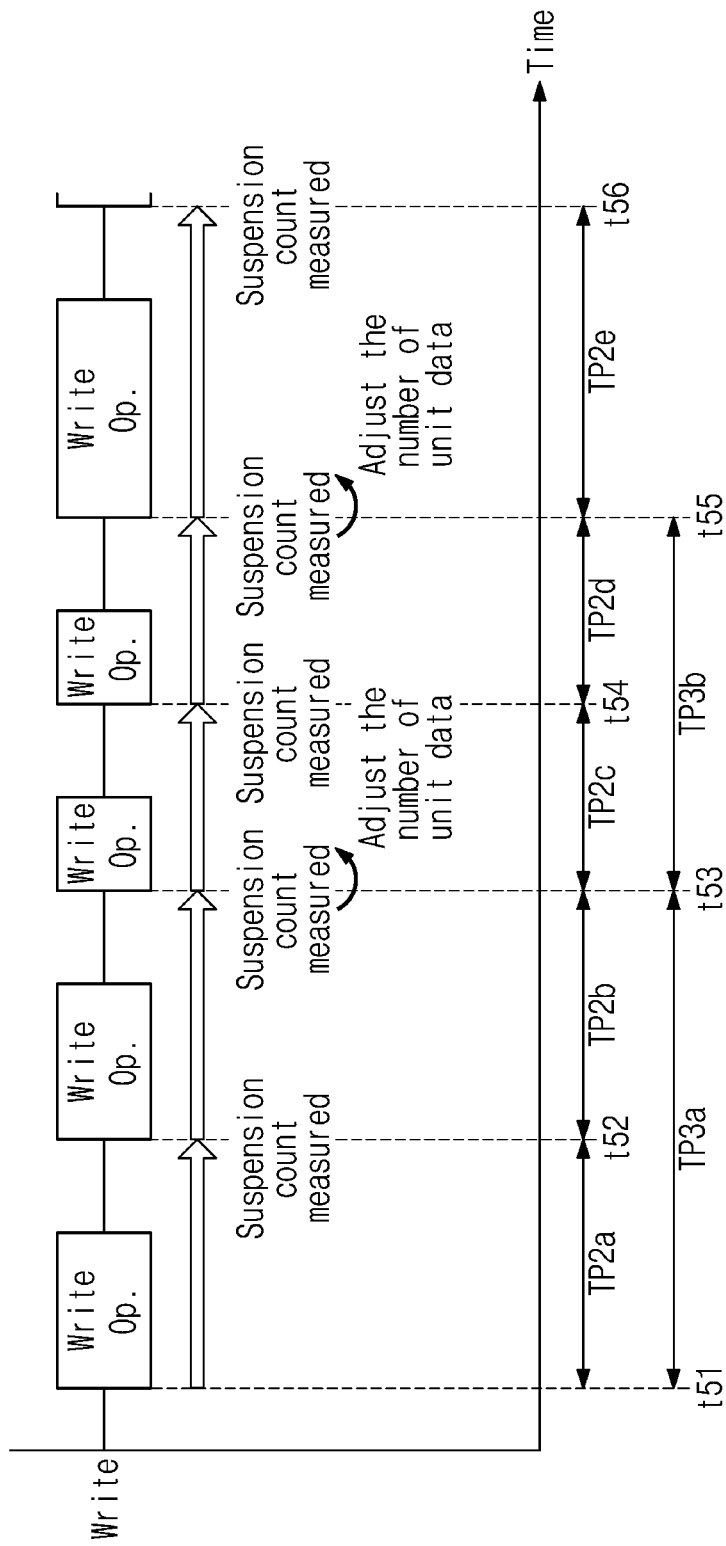
FIGS. 12 to 15 are timing diagrams for describing example operations of a controller of FIG. 3 according to some example embodiments.

FIG. 12 is a timing diagram for describing an example operation of the controller 1330 of FIG. 3 according to some embodiments.

For example, at time points t51, t52, t53, t54, t55, and t56, write operations may start and may be performed. The suspension monitor 1338 may measure counts that the write operations are suspended in respective monitoring time periods TP2a, TP2b, TP2c, TP2d, and TP2e.

In some embodiments, instead of throttling or adjusting a data amount after each of the monitoring time periods TP2a, TP2b, TP2c, TP2d, and TP2e, the controller 1330 may refer to suspension counts measured in several monitoring time periods. In this case, influence of a sudden change or an exceptional change of a suspension count may be relieved.

In the example of FIG. 12, the controller 1330 may throttle or adjust a data amount for a following write operation taking into account suspension counts measured in two monitoring time periods. For example, instead of taking into account only a suspension count measured in the monitoring time period TP2a, the controller 1330 may adjust an amount of data for a write operation to be started at time point t53 taking into account suspension counts measured in a time period TP3a including the monitoring time periods TP2a and TP2b. For example, a sum, an average, or another measure of suspension counts measured in the monitoring time periods TP2a and TP2b may be used.

Likewise, the controller 1330 may adjust an amount of data for a write operation to be started at time point t55 taking into account suspension counts measured in a time period TP3b including the monitoring time periods TP2c and TP2d. However, the example operation of FIG. 12 is provided to facilitate better understanding, and the number of monitoring time periods referenced for throttling may be variously changed or modified.

Figure 13:
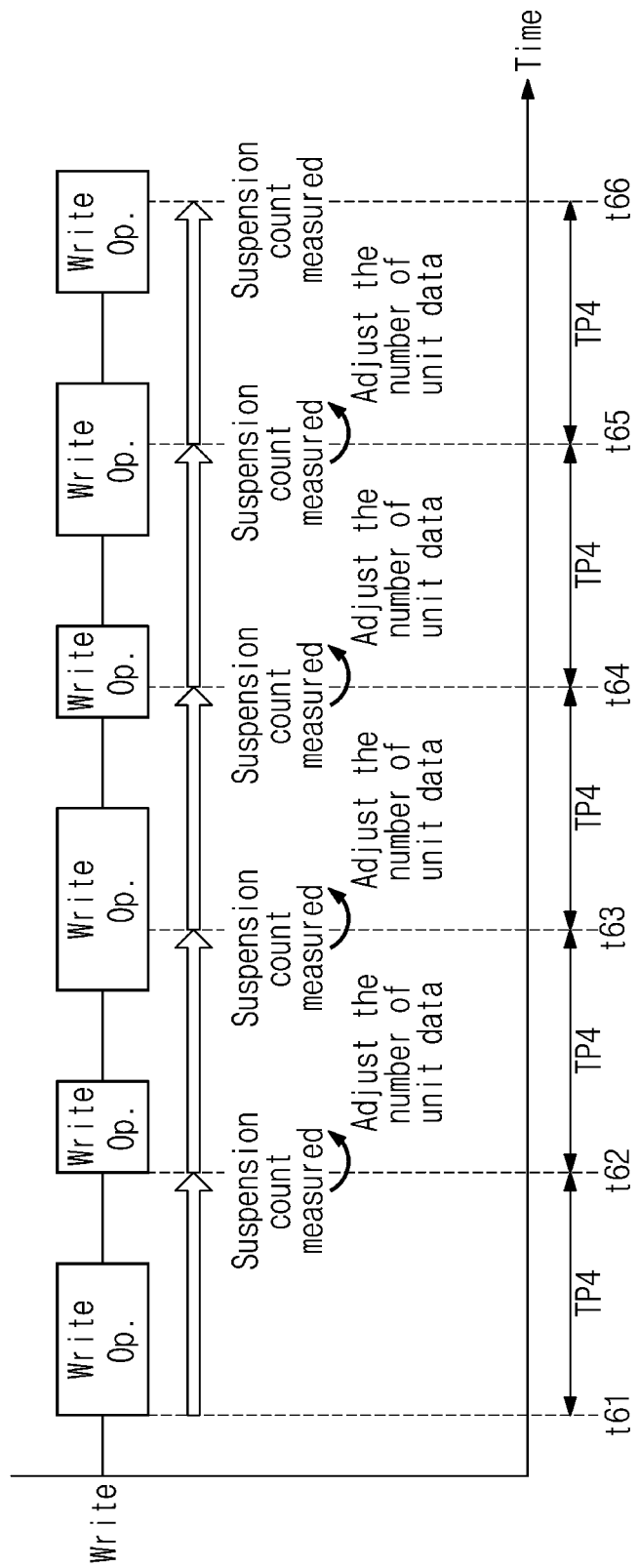

FIG. 13 is a timing diagram for describing an example operation of the controller 1330 of FIG. 3 according to some embodiments.

In some embodiments, instead of defining a monitoring time period based on start of a write operation, the suspension monitor 1338 may measure a count that write operations are suspended for each reference time duration. The controller 1330 may refer to suspension counts measured for each reference time duration having a constant length.

In the example of FIG. 13, the suspension monitor 1338 may measure a count that write operations are suspended in a reference time duration TP4 between time points t61 and t62. The controller 1330 may throttle or adjust, based on a suspension count measured in the reference time duration TP4 between time points t61 and t62, a data amount for a write operation to be performed after time point t62.

In such a manner, the suspension monitor 1338 may measure counts that write operations are suspended in respective reference time durations TP4s between time points t62 and t63, between time points t63 and t64, between time points t64 and t65, and between time points t65 and t66. The controller 1330 may throttle or adjust a data amount based on the measured suspension counts. In this case, two or more write operations may be performed within one reference time duration TP4.

The examples of FIGS. 9 to 13 have been described with regard to a suspension count, but the embodiments are not limited thereto. A frequency that a write operation is suspended may be variously changed or modified to be monitored by using another measurement other than the suspension count. For example, time intervals between time points that write operations are suspended may be referenced (together with the suspension count or instead of the suspension frequency) to determine whether a suspension frequency is frequent or rare.

Figure 14:
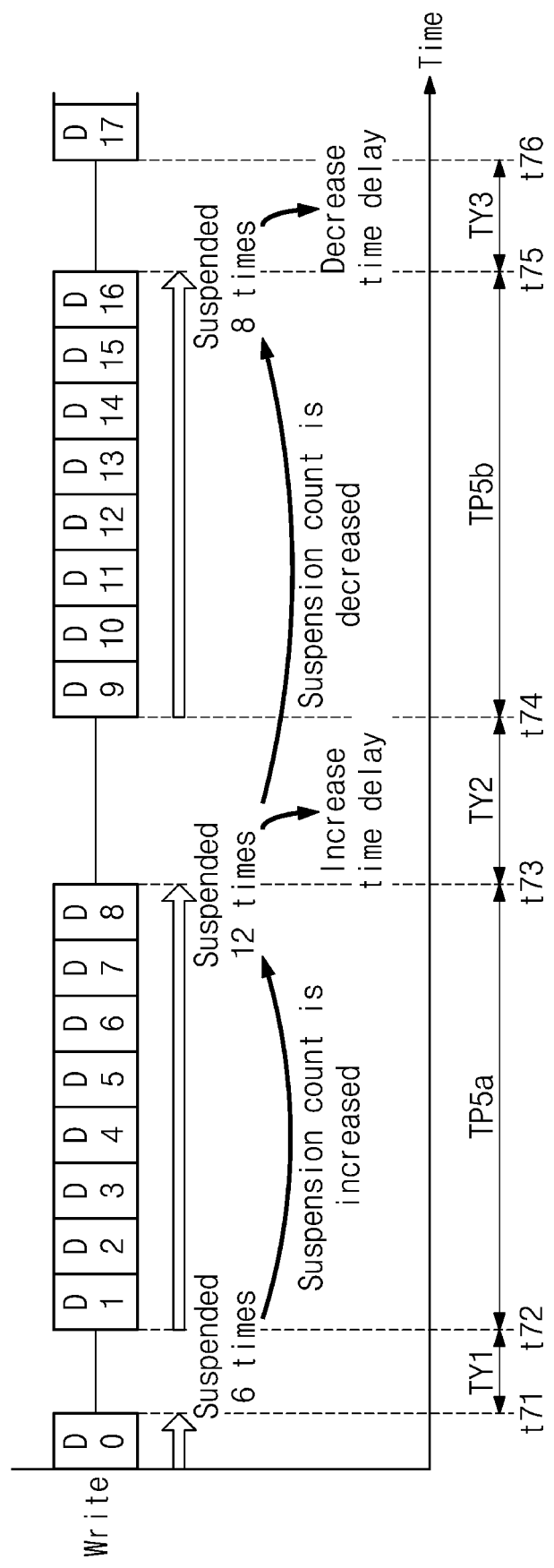

FIG. 14 is a timing diagram for describing an example operation of the controller 1330 of FIG. 3 according to some embodiments.

In the example of FIG. 14, the controller 1330 may control write operations such that a time delay is provided between a preceding write operation and a following write operation. In some embodiments, adjusting a manner of communicating data between the controller 1330 and the memory devices 1310 may include adjusting a time delay between a preceding write operation and a following write operation. For example, the write processor 1332 may adjust a time delay to adjust a communication bandwidth and to adjust an amount of data to be communicated per unit time.

For example, a write operation associated with data D0 may be completed at time point t71. This write operation may have been suspended six (6) times. A time delay TY1 may be provided between time points t71 and t72.

A write operation associated with data D1 to D8 may start at time point t72, and may be completed at time point t73. This write operation may be suspended 12 times during a monitoring time period TP5a. A time delay TY2 may be provided between time points t73 and t74.

As a suspension count increases from 6 to 12, the write processor 1332 may increase a time delay. Accordingly, the time delay TY2 may be longer than the time delay TY1. When a time delay increases, an amount of data communicated with the memory devices 1310 per unit time or a bandwidth may decrease. Accordingly, a suspension frequency may decrease.

Afterwards, a write operation associated with data D9 to D16 may start at time point t74, and may be completed at time point t75. This write operation may be suspended 8 times during a monitoring time period TP5b. A time delay TY3 may be provided between time points t75 and t76. A write operation associated with data D17 may start at time point t76.

As the suspension count decreases from 12 to 8, the write processor 1332 may decrease a time delay. Accordingly, the time delay TY3 may be shorter than the time delay TY2. When a time delay decreases, the amount of data communicated with the memory devices 1310 per unit time or the bandwidth may increase. Accordingly, operation performance may be improved.

Similar to the margin time intervals TM1a, TM1b, and TM1c of FIGS. 9 and 10, during the time delays TY1, TY2, and TY3, a write operation may not be performed and a read operation may be performed. A read operation performed during the time delays TY1, TY2, and TY3 may not affect suspension of a write operation. Similar to the embodiment of FIGS. 9 and 10, when the time delays TY1, TY2, and TY3 are used, a delay of a read operation may be prevented.

Figure 15:
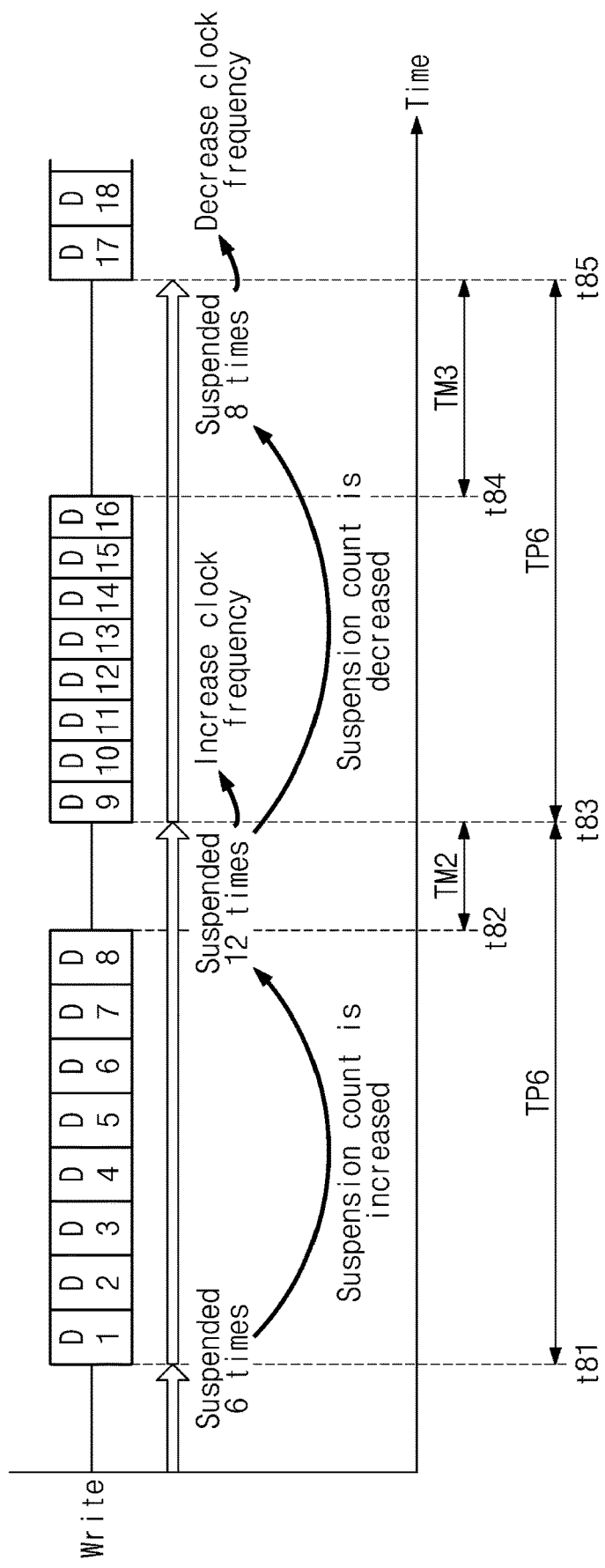

FIG. 15 is a timing diagram for describing an example operation of the controller 1330 of FIG. 3 according to some embodiments.

In some embodiments, adjusting a manner of communicating data between the controller 1330 and the memory devices 1310 may include adjusting a clock for communicating data of a following write operation. For example, the write processor 1332 may control a clock to adjust an amount of communicated data per unit time.

For example, a write operation before time point t81 may be suspended six (6) times. A write operation associated with data D1 to D8 may start at time point t81, and may be completed at time point t82. This write operation may be suspended 12 times during a monitoring time period TP6 between time points t81 and t83. Afterwards, a write operation associated with data D9 to D16 may start at time point t83, and may be completed at time point t84.

As a suspension count increases from 6 to 12, the write processor 1332 may increase a frequency of a clock for communicating data. When the clock frequency increases, a larger amount of data may be communicated within a short time. Accordingly, a margin time interval TM3 longer than a margin time interval TM2 may be secured, and a suspension frequency of a write operation may decrease.

The write operation started at time point t83 may be suspended 8 times during a monitoring time period TP6 between time points t83 and t85. Afterwards, a write operation associated with data D17 and D18 may start at time point t85.

As the suspension count decreases from 12 to 8, the write processor 1332 may decrease the frequency of the clock for communicating data. When the clock frequency decreases, a time taken to communicate data may increase. In this case, a secured margin time interval may be short, but communication may be performed stably.

Similar to the margin time intervals TM1a, TM1b, and TM1c of FIGS. 9 and 10, in the margin time intervals TM2 and TM3, a write operation may not be performed and a read operation may be performed. A read operation which is performed in the margin time intervals TM2 and TM3 may not affect suspension of a write operation. Similar to the embodiment of FIGS. 9 and 10, as the margin time intervals TM2 and TM3 are provided, a delay of a read operation may be prevented.

Some embodiments for adjusting a manner of communicating data between the controller 1330 and the memory devices 1310 have been described with reference to FIGS. 9 to 15, but the embodiments are not limited thereto. Adjusting the communication manner may be variously changed or modified to prevent a delay of a read operation.

The embodiments of FIGS. 9 to 15 have been described independently, but the embodiments of FIGS. 9 to 15 may be mutually complementary, not mutually exclusive. The storage device 1300 according to some embodiments may be implemented by combining all or some of the embodiments described with reference to FIGS. 9 to 15.

In the embodiments described with reference to FIGS. 7 to 15, the controller 1330 may throttle or adjust a data amount without affecting suspension of a following write operation. That is, the embodiments may not consider how to suspend a following write operation, but may be configured to consider how to adjust an amount of data communicated for the following write operation.

Meanwhile, the embodiments of FIGS. 7 to 15 have been described that a communication manner for a write operation is adjusted based on a suspension frequency of a write operation. However, the embodiments are not limited thereto. For example, the embodiments may be implemented to adjust a communication manner for a following read operation succeeding a preceding read operation, based on a suspension frequency of a write operation.

For example, when frequencies that write operations are suspended become frequent or increase, the read processor 1333 may decrease an amount of data communicated between the controller 1330 and the memory devices 1310 per unit time in a following read operation. When the amount of data communicated in the following read operation decreases, write operations may be prevented from being suspended or delayed due to the following read operation, or a suspension or a delay of write operations may be relieved.

On the other hand, when frequencies that write operations are suspended become rare or decrease, the read processor 1333 may increase an amount of data communicated between the controller 1330 and the memory devices 1310 per unit time. In this case, performance of the following read operation may be improved.

As such, it may be readily understood that the same purposes as described with reference to FIGS. 7 to 15 may be achieved even in a case of throttling an amount of data communicated per unit time or a bandwidth such that the read processor 1333 processes read data as much as a data amount determined based on a monitored frequency. To this end, the read processor 1333 may adjust an amount of read data or a bandwidth in similar manners to those described with reference to FIGS. 7 to 15.

For example, the read processor 1333 may increase or decrease the number of unit data for a read operation, or may increase or decrease a time delay between read operations. Additionally or alternatively, the read processor 1333 may increase or decrease a frequency of a clock for communicating read data. Besides, the read processor 1333 may employ various manners to throttle an amount of read data or a bandwidth.

As such, in a system where a first operation of a low priority is suspended in response to a request of a second operation of a high priority, a suspension frequency of the first operation may be managed based on adjusting a communication manner for the first operation and/or adjusting a communication manner for the second operation.

Figure 16:
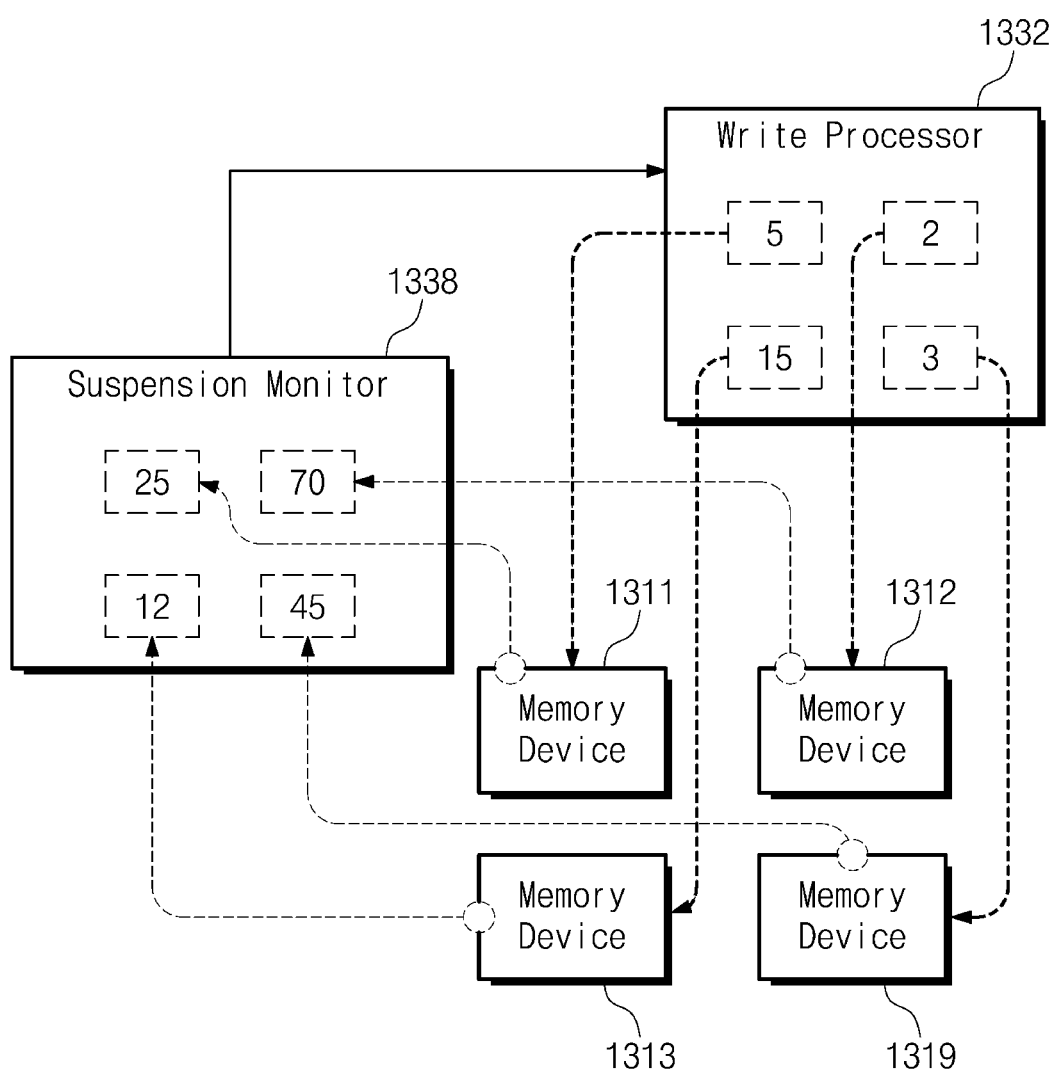
FIG. 16 is a conceptual diagram for describing an example configuration and an example operation associated with a suspension monitor of FIG. 3.

FIG. 16 is a conceptual diagram for describing an example configuration and an example operation associated with the suspension monitor 1338 of FIG. 3.

For example, the memory devices 1310 may include four memory devices 1311, 1312, 1313, and 1319. In some cases, the memory devices 1311, 1312, 1313, and 1319 may independently operate in response to separate commands (e.g., a write command WCMD and/or a read command RCMD). For example, an operation performed on the memory device 1311 may not affect operations which are performed on the memory devices 1312, 1313, and 1319.

The suspension monitor 1338 may include separate modules 25, 70, 12 and 45 to separately monitor suspension frequencies associated with the respective memory devices 1311, 1312, 1313, and 1319. The write processor 1332 and the read processor 1333 may independently control the memory devices 1311, 1312, 1313, and 1319 based on the respective suspension frequencies. The write processor 1332 may include separate modules 2, 3, 5 and 15 to respectively control the memory devices 1312, 1319, 1311 and 1313. For example, an amount of data communicated with the memory device 1311 may be adjusted independently of amounts of data communicated with the memory devices 1312, 1313, and 1319.

In some cases, one memory device may include memory areas (e.g., planes) which operate independently in response to separate commands. In this case, the suspension monitor 1338 may separately monitor suspension frequencies associated with the respective memory areas, and throttling associated with the memory areas may be independently performed.

According to the embodiments described with reference to FIGS. 7 to 15, an amount of data communicated with each of the memory devices 1311, 1312, 1313, and 1319 or a bandwidth may increase or decrease. For example, a suspension frequency of an operation performed at one memory device (e.g., the memory device 1311) may be relatively higher, and a suspension frequency of an operation performed at another memory device (e.g., the memory device 1312) may be relatively lower. In this case, even though a data amount or a bandwidth for the memory device 1311 decreases, a data amount or a bandwidth for the memory device 1312 may increase or may be maintained.

In the above example, the controller 1330 may manage priorities such that a priority of data communicated with the memory device 1312 is higher than a priority of data communicated with the memory device 1311. Accordingly, the write processor 1332 and the read processor 1333 may process communication with the memory device 1312 more frequently than communication with the memory device 1311. In this case, even though operation performance for the memory device 1311 is somewhat degraded (due to a decrease in the data amount or the bandwidth), the number of unit data exchanged with all the memory devices 1311, 1312, 1313, and 1319 may not decrease. Accordingly, operation performance for all the memory devices 1311, 1312, 1313, and 1319 may be maintained or secured without degradation.

Figure 17:
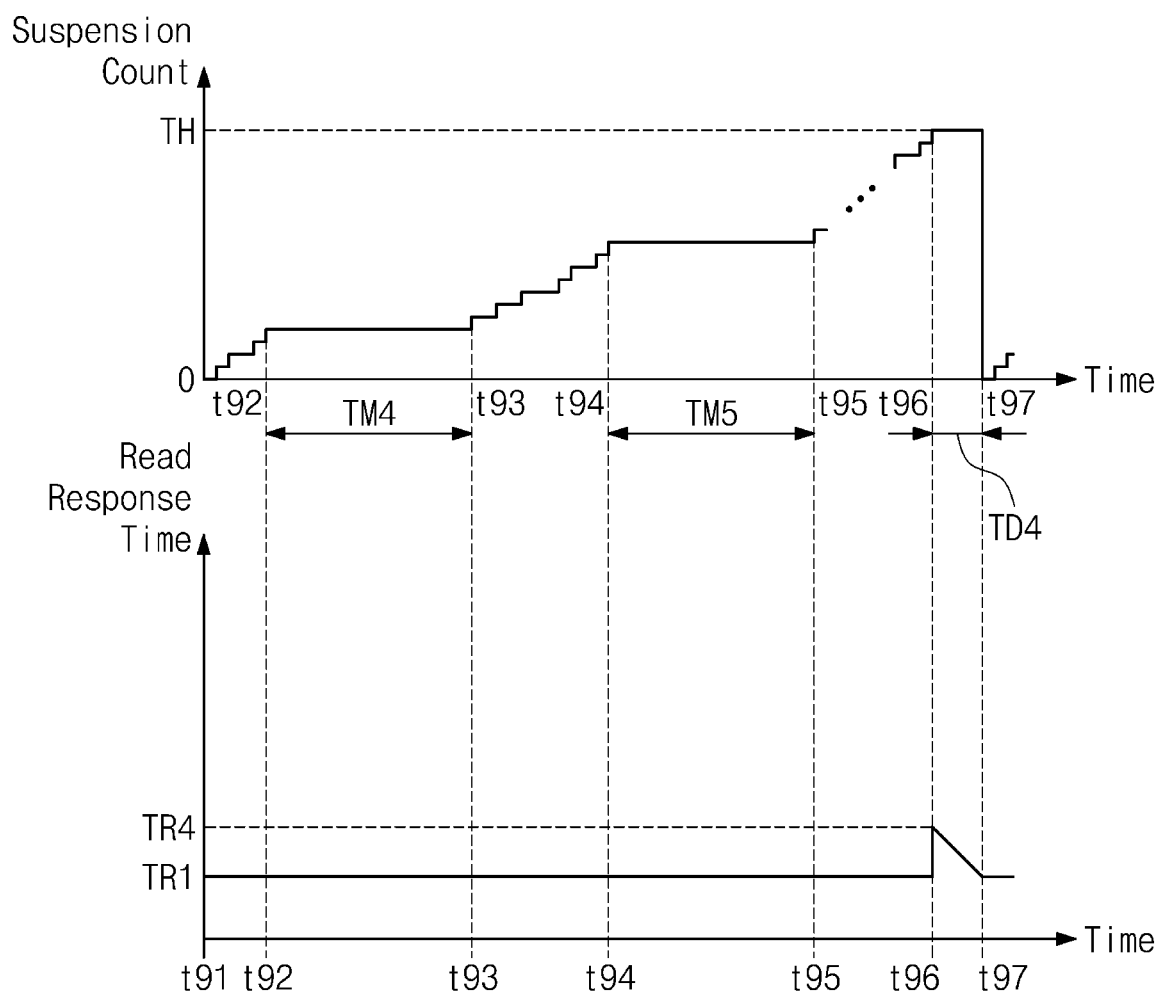
FIG. 17 is a graph for describing a characteristic associated with operations of FIGS. 7 to 16.

FIG. 17 is a graph for describing a characteristic associated with the operations of FIGS. 7 to 16.

According to the embodiments described with reference to FIGS. 7 to 16, the controller 1330 may adjust a manner of communicating data with the memory devices 1310. Accordingly, in some embodiments, a margin time interval and/or a time delay may be provided between write operations, and meanwhile, a read operation may be performed without suspending a write operation.

For example, referring to FIG. 17, a margin time interval TM4 between time points t92 and t93 and a margin time interval TM5 between time points t94 and t95 may be provided. In the margin time intervals TM4 and TM5, a suspension frequency may not change. Accordingly, a time taken for the suspension frequency to reach the maximum suspension frequency TH may be delayed.

In this regard, suspensions of write operations may be prevented from intensively occurring during earlier time periods, and the suspension of the write operations may be distributed over all the write operations which are performed between time points t91 and t97. Accordingly, a time period TD4 between time points t96 and t97 after the suspension frequency reaches the maximum suspension frequency TH may be short (e.g., in comparison to the time TD2 period of FIG. 6). In some cases, the time period TD4 may not occur.

As a result, a read response may be provided within a short time length TR1 for a long time period (e.g., for a time period between time points t91 and t96). In addition, even though the suspension frequency reaches the maximum suspension frequency TH at time point t96, the time period TD4 may be short, and thus a time length TR4 required for a read response may not be long. Therefore, the delay of the read operation described with reference to FIG. 5 may be prevented or minimized.

The above descriptions are intended to provide example configurations and operations for implementing the inventive concept. The inventive concept may include implementations which may be obtained by simply changing or modifying the above embodiments, in addition to the above-described embodiments. Also, the inventive concept may include implementations which may be accomplished by easily changing or modifying the above-described embodiments in the future.

What is claimed is:

1. A storage device comprising:
a memory; and
a controller configured to control the memory such that:
in response to a request for a first read operation on the memory while a first write operation is performed on the memory, the first write operation is suspended, and the first read operation is performed;
the suspended first write operation is resumed after the first read operation is completed; and
a second write operation subsequent to the first write operation is performed on the memory after the resumed first write operation is completed,
wherein the controller is further configured to throttle, based on a first frequency of the first write operation being suspended, an amount of data communicated with the memory for the second write operation or for a second read operation subsequent to the first read operation, and
wherein the controller comprises:
a write processor to throttle the amount of the data communicated with the memory for the second write operation such that the data is transmitted to the memory as much as an amount determined based on the first frequency.

2. The storage device of claim 1, wherein the controller comprises:
a suspension monitor configured to monitor the first frequency.

3. The storage device of claim 2, wherein the suspension monitor is further configured to monitor a second frequency of a third write operation prior to the first write operation being suspended, and
wherein the write processor is further configured to throttle the amount of the data communicated with the memory for the second write operation based on a relationship between the first frequency and the second frequency.

4. The storage device of claim 3, wherein the write processor is configured to throttle the amount of the data communicated with the memory for the second write operation such that:
an amount of the data transmitted to the memory per unit time decreases in response to determining that the first frequency is greater than the second frequency; and
the amount of the data transmitted to the memory per unit time increases in response to determining that the first frequency is less than the second frequency.

5. The storage device of claim 1, wherein the controller is further configured to monitor the first frequency for a reference time period or during a time period in which the first write operation is performed to completion.

6. The storage device of claim 1, wherein when read operations are requested while a plurality of write operations are performed on the memory, the controller is configured to control the memory such that the write operations are suspended and resumed to complete the read operations earlier than the write operations, and
wherein the controller is configured to throttle, based on frequencies that the write operations are suspended, an amount of the data communicated with the memory with regard to the read operations or the write operations.

7. A storage device comprising:
a memory; and
a controller configured to communicate first data with the memory during a first time period, and communicate second data with the memory during a second time period,
wherein the communication of the first data with the memory is suspended during the first time period with a first frequency, and
wherein the controller is further configured to adjust, based on the first frequency of the communication of the first data with the memory being suspended, an amount of the second data communicated with the memory per unit time without affecting a suspension of the communication of the second data with the memory.

8. The storage device of claim 7, wherein the controller is configured to suspend the communication of the first data with the memory to perform an operation associated with third data which is requested to be processed earlier than the first data.

9. The storage device of claim 7, wherein the second data includes one or more unit data, and
wherein the controller is configured to increase or decrease a number of the one or more unit data included in the second data such that the amount of the second data communicated with the memory per unit time increases or decreases.

10. The storage device of claim 9, wherein the controller comprises a buffer which is configured to buffer data to be communicated with the memory, and
in response to determining that the number of the one or more unit data included in the second data decreases, the data of the buffer remains after the controller completes the communication of the second data with the memory.

11. The storage device of claim 7, wherein the controller is configured to increase or decrease a time delay between the first time period and the second time period such that the amount of the second data communicated with the memory per unit time increases or decreases.

12. The storage device of claim 11, wherein the controller is configured to communicate fourth data, which is requested to be processed earlier than the first data and the second data, with the memory such that communicating the fourth data with the memory does not affect suspension of communication of the first data and the second data with the memory.

13. A storage device comprising:
a memory; and
a controller configured to control the memory such that, while first operations are performed on the memory, in response to receiving requests for second operations on the memory, the first operations are suspended and the second operations are completed earlier than the first operations,
wherein the controller is further configured to adjust, based on a frequency of each of preceding first operations among the first operations being suspended, a manner of communicating data with the memory to perform following first operations, among the first operations, subsequent to respective ones of the preceding first operations,
wherein the controller is further configured to adjust the manner of communicating the data with the memory such that suspensions of the first operations are distributed over a time period of the first operations, and
wherein the frequency of each of the preceding first operations being suspended is associated with at least one of a count that each of the preceding first operations is suspended or time intervals between time points where the preceding first operations are suspended.

14. The storage device of claim 13, wherein in response to determining that frequencies that the preceding first operations are suspended increase, the controller is configured to adjust the manner of communicating the data with the memory to decrease an amount of the data communicated with the memory per unit time, and
wherein in response to determining that the frequencies that the preceding first operations are suspended decrease, the controller is configured to adjust the manner of communicating the data with the memory to increase the amount of the data communicated with the memory per unit time.

15. The storage device of claim 13, wherein adjusting the manner of communicating the data with the memory includes at least one of adjusting an amount of the data communicated with the memory, adjusting time delays between the preceding first operations and the following first operations, or controlling a clock for communicating the data with the memory.

16. A storage device comprising:
a memory; and
a controller configured to:
control the memory such that, while a first operation is performed on the memory, in response to a request for a second operation on the memory, the first operation is suspended and the second operation is completed earlier than the first operation; and
monitor a frequency of the first operation being suspended,
wherein the controller is further configured to control the memory such that, based on the monitored frequency, data for a third operation subsequent to the first operation is communicated with the memory as much as a data amount or a bandwidth determined based on the monitored frequency,
wherein the controller is further configured to control the memory such that, in a time interval before a fourth operation subsequent to the third operation starts after the communication of the data with the memory for the third operation is completed, a fifth operation on the memory is performed without suspending an operation corresponding to the third operation and the fourth operation, and
wherein a priority of each of the second operation and the fifth operation is higher than a priority of each of the first operation, the third operation, and the fourth operation.

17. The storage device of claim 16, wherein the controller is configured to measure a count that the third operation and the fourth operation are suspended, and
wherein as the fifth operation is performed in the time interval, the count does not change.

* * * * *